US012176672B2

(12) United States Patent
Dudley et al.

(10) Patent No.: US 12,176,672 B2
(45) Date of Patent: Dec. 24, 2024

(54) ISOLATION OF WAVEGUIDE-INTEGRATED DETECTORS USING A BACK END OF LINE PROCESS

(71) Applicant: Psiquantum, Corp., Palo Alto, CA (US)

(72) Inventors: Eric Dudley, Palo Alto, CA (US); Yong Liang, Niskayuna, NY (US); Faraz Najafi, Palo Alto, CA (US); Vimal Kamineni, Palo Alto, CA (US); Ann Melnichuk, Palo Alto, CA (US)

(73) Assignee: Psiquantum, Corp., Palo Alto, CA (US)

( * ) Notice: Subject to any disclaimer, the term of this patent is extended or adjusted under 35 U.S.C. 154(b) by 780 days.

(21) Appl. No.: 17/239,085

(22) Filed: Apr. 23, 2021

(65) Prior Publication Data
US 2021/0242651 A1   Aug. 5, 2021

Related U.S. Application Data

(63) Continuation of application No. PCT/US2019/058190, filed on Oct. 25, 2019.
(Continued)

(51) Int. Cl.
*H01S 3/067* (2006.01)
*G02B 6/122* (2006.01)
*G02B 6/12* (2006.01)

(52) U.S. Cl.
CPC ........ *H01S 3/06708* (2013.01); *G02B 6/1225* (2013.01); *H01S 3/06704* (2013.01);
(Continued)

(58) Field of Classification Search
CPC ............. H01S 3/06708; H01S 3/06704; G02B 6/1225; G02B 2006/12121;
(Continued)

(56) References Cited

U.S. PATENT DOCUMENTS

| 6,919,508 B2 * | 7/2005 | Forcier ............... H01L 23/3128 |
| | | 257/E23.092 |
| 7,170,142 B2 * | 1/2007 | Wojcik .................. B82Y 20/00 |
| | | 362/610 |

(Continued)

FOREIGN PATENT DOCUMENTS

| CN | 102208425 A | 10/2011 |
| CN | 104051477 A | 9/2014 |
| WO | 2013142815 A1 | 9/2013 |

OTHER PUBLICATIONS

PCT/US2019/058190, "International Preliminary Report on Patentability", May 6, 2021, 9 pages.
(Continued)

*Primary Examiner* — Vu A Vu
(74) *Attorney, Agent, or Firm* — Kilpatrick Townsend & Stockton LLP

(57) ABSTRACT

An optical device includes a substrate, a dielectric layer on the substrate, a waveguide within the dielectric layer, a light sensitive component (e.g., a photodetector) in the dielectric layer and coupled to the waveguide, and a plurality of light isolation structures in at least one of the substrate or the dielectric layer and configured to prevent stray light from reaching the light sensitive component. In some embodiments, a light isolation structure in the plurality of light isolation structures includes two opposing sidewalls and a filling material between the two opposing sidewalls. The two opposing sidewalls include an optical isolation layer. The filling material is characterized by a coefficient of thermal expansion (CTE) matching a CTE of at least one of the substrate or the dielectric layer.

20 Claims, 25 Drawing Sheets

Related U.S. Application Data

(60) Provisional application No. 62/887,364, filed on Aug. 15, 2019, provisional application No. 62/751,447, filed on Oct. 26, 2018.

(52) U.S. Cl.
CPC .............. *G02B 2006/12121* (2013.01); *G02B 2006/1213* (2013.01)

(58) Field of Classification Search
CPC  G02B 2006/1213; G02B 6/125; G02B 6/132; G02B 6/34; G02B 2006/12107; G02B 6/12004; G02B 2006/12104; G02B 2006/12126; G01J 1/0214; G01J 1/0295; G01J 5/06; G01J 5/0818; G01J 2005/208; G01J 1/0425; G01J 2001/442
USPC .......................................................... 372/6
See application file for complete search history.

(56) References Cited

U.S. PATENT DOCUMENTS

| | | | | |
|---|---|---|---|---|
| 7,483,140 | B1 * | 1/2009 | Cho ..................... | G01N 21/553 356/448 |
| 8,531,045 | B2 * | 9/2013 | Kärkkäinen ........... | G02B 6/305 257/788 |
| 8,558,336 | B2 * | 10/2013 | Su ......................... | H01L 31/105 257/432 |
| 8,633,067 | B2 * | 1/2014 | Assefa .............. | H01L 21/76283 438/154 |
| 8,866,187 | B2 * | 10/2014 | Na ...................... | H01L 31/1804 257/184 |
| 9,048,371 | B2 * | 6/2015 | Ang .................. | H01L 31/02327 |
| 9,105,772 | B2 * | 8/2015 | Pomerene .............. | G02B 6/122 |
| 9,117,946 | B2 * | 8/2015 | Assefa ................ | H01L 31/0745 |
| 9,322,901 | B2 * | 4/2016 | Kerness .................. | G01S 17/58 |
| 9,470,956 | B2 * | 10/2016 | Mazur ................... | G02F 1/3501 |
| 9,524,898 | B2 * | 12/2016 | Cheng ................ | H01L 31/0352 |
| 9,772,447 | B2 * | 9/2017 | Keyvaninia ........... | H01S 5/0215 |
| 10,305,250 | B2 * | 5/2019 | Bhattacharya ...... | H01L 31/1856 |
| 10,734,533 | B2 * | 8/2020 | Cheng ............... | H01L 31/02019 |
| 2008/0116537 | A1 | 5/2008 | Adkisson et al. | |
| 2009/0020701 | A1 | 1/2009 | Frey | |
| 2010/0244173 | A1 | 9/2010 | Wang et al. | |
| 2013/0082286 | A1 | 4/2013 | Finkelstein et al. | |
| 2017/0148837 | A1 | 5/2017 | Hiyama et al. | |

OTHER PUBLICATIONS

PCT/US2019/058190, "International Search Report and Written Opinion", Feb. 19, 2020, 12 pages.
PCT/US2019/058190, "Invitation to Pay Additional Fees and, Where Applicable, Protest Fee", Dec. 31, 2019, 2 pages.
CA3, 117,783, "Office Action", Jan. 27, 2023, 4 pages.
CA3, 117,783, "Office Action", May 18, 2022, 3 pages.
EP19875311.3, "Extended European Search Report", Jun. 30, 2022, 9 pages.
Hsu, et al., "Dramatic Reduction of Optical Crosstalk in Deep-Submicrometer CMOS Imager With Air Gap Guard Ring", IEEE Electron Device Letters, vol. 25, No. 6, Jun. 2004, pp. 375-377.
Schwartz, et al., "Fully On-Chip Single-Photon Hanbury-Brown and Twiss Experiment on a Monolithic Semiconductor-Superconductor Platform", Arxiv.org, Cornell University Library, 201 Olin Library Cornell University, XP081139994, Jun. 11, 2018, pp. 1-21.
Schwartz, et al., "Generation, Guiding and Splitting of Triggered Single Photons from a Resonantly Excited Quantum Dot in a Photonic Circuit", Optics Express, vol. 24, No. 3, Feb. 5, 2016, pp. 3089-3094.
Tut, et al., "Vertical Waveguides Integrated with Smcon Photodetectors: Towards High Efficiency and Low Cross-Talk Image Sensors", Applied Physics Letters, American Institute of Physics, vol. 100, No. 4, Jan. 24, 2012, pp. 43504-1-43504-3.
CA 3,117,783, "Notice of Allowance", Oct. 17, 2023, 1 page.
CN201980081565.8, "Office Action", Jul. 31, 2014, 14 pages.

* cited by examiner

ISOLATION OF WAVEGUIDE-INTEGRATED DETECTORS USING A BACK END OF LINE PROCESS

CROSS-REFERENCE TO RELATED APPLICATIONS

This application claims priority to and is a continuation of International Patent Application No. PCT/US2019/058190, filed Oct. 25, 2019; which claims priority to U.S. Provisional Patent Application No. 62/751,447, filed Oct. 26, 2018 and U.S. Provisional Patent Application No. 62/887,364, filed Aug. 15, 2019, the entire contents of which are hereby incorporated by reference in their entirety for all purposes.

BACKGROUND

Optoelectronic devices with high sensitivity, such as single-photon detectors, may be used in many photonic quantum technologies, such as quantum cryptography and quantum computing. Because of their high sensitivity, these photodetectors may be very susceptible to noise, such as undesired ambient light or stray light that may reach the photodetectors through direct or indirect paths.

SUMMARY

This disclosure relates generally to photodetectors. More specifically, this disclosure relates to techniques for preventing background light from reaching a highly sensitive photodetector (e.g., a superconducting nanowire single-photon detector) in a photonic integrated circuit (PIC), in order to achieve the high sensitivity and high signal-to-noise ratio (SNR). According to certain embodiments, the photonic integrated circuit may include light isolation structures fabricated using CMOS back-end-of-line (BEOL) processes to prevent ambient light or stray light from reaching the photodetector directly or indirectly. The light isolation structures may include, for example, metal layers, arrays of vias, air gaps, trenches filled with reflective or absorptive materials, and the like. The light isolation structures may provide local and/or global isolations to photodetectors and/or waveguides at different locations, such as the input ports and output ports of the photonic integrated circuit and the photodetector, such that any scattered, reflected, diffused, or otherwise leaked light from either a light source or the photonic integrated circuit is partially or fully blocked and thereby prevented from reaching the photodetector.

According to some embodiments, a device may include a substrate, a dielectric layer on the substrate, a waveguide within the dielectric layer, a light sensitive component in the dielectric layer and coupled to the waveguide, and a plurality of light isolation structures in at least one of the substrate or the dielectric layer and adjacent to the light sensitive components. The plurality of light isolation structures may be configured to reflect or absorb stray light to prevent the stray light from reaching the light sensitive component. In various embodiments, the plurality of light isolation structures may include, for example, a metal trench in the dielectric layer, an array of metal vias in the dielectric layer, a metal cover in the dielectric layer and on top of the light sensitive component, a deep trench in the substrate and including an air gap or filled with a light reflection or absorption material, or any combination. In some embodiments, the metal cover may be in a metal layer and may be aligned with or coupled to the metal trench or the array of metal vias to form a contiguous structure surrounding the light sensitive component. In some embodiments, the waveguide may include an input port, where the metal trench or the array of metal vias may be located at a region including the input port. The light sensitive component may include a single-photon detector, such as a superconducting nanowire single-photon detector. The dielectric layer may include, for example, an oxide layer.

In some embodiments, a light isolation structure in the plurality of light isolation structures may include two opposing sidewalls each including an optical isolation layer, and a filling material between the two opposing sidewalls and characterized by a coefficient of thermal expansion (CTE) matching a CTE of at least one of the substrate or the dielectric layer. The filling material may be, for example, polysilicon or silicon dioxide. In some embodiments, the optical isolation layer may be characterized by a thickness greater than a value such that the two opposing sidewalls in combination are optically opaque. In some embodiments, the thickness may be less than 60 nm. In some embodiments, the optical isolation layer may include a metal nitride, such as TiN, TaN, ZrN, or WN.

In some embodiments, the plurality of light isolation structures may include a first light isolation structure in the substrate and a second light isolation structure in the dielectric layer. The CTE of the filling material in the first isolation structure may match the CTE of the substrate, and the CTE of the filling material in the second light isolation structure may match the CTE of the dielectric layer. The first light isolation structure may be aligned with or is offset from the second light isolation structure.

In some embodiments, each of the two opposing sidewalls may further include a first adhesion layer between the optical isolation layer and at least one of the dielectric layer or the substrate. The first adhesion layer may be characterized by a thickness less than 20 nm. The first adhesion layer may include, for example, a titanium layer. In some embodiments, each of the two opposing sidewalls may further include a second adhesion layer between the optical isolation layer and the filling material. The second adhesion layer may be characterized by a thickness less than 20 nm, and may include, for example, a titanium layer. In some embodiments, the device may also include an unfilled trench in the substrate or the dielectric layer, where sidewalls of the unfilled trench may be optically opaque.

According to some embodiments, a method may include receiving a photonic integrated circuit that may include a substrate, a dielectric layer on the substrate, a waveguide, and a light sensitive component coupled to the waveguide, where the waveguide and the light sensitive component are in the dielectric layer. The method may also include etching vias or a trench in the dielectric layer surrounding the light sensitive component to expose a portion of the substrate, filling the vias or the trench with a light reflection or light absorption material, forming a top metal cover on the dielectric layer and on top of the light sensitive component, and etching the substrate from a backside of the substrate opposite to the dielectric layer to form a deep trench in the substrate.

In some embodiments, the method may also include filling the deep trench with the light reflection or light absorption material. In some embodiments, the method may also include depositing a thin adhesion layer on exposed surfaces of the deep trench, depositing a thin optical isolation layer on the thin adhesion layer, and depositing a filling material layer on the thin optical isolation layer, where the filling material layer may fill the deep trench and may be characterized by a coefficient of thermal expansion (CTE)

that matches a CTE of the substrate. In some embodiments, the top metal cover is in a metal-1 layer. In some embodiments, the method may also include forming additional dielectric layers and metal layers on the dielectric layer. In some embodiments, the method may also include etching additional vias or trenches in the dielectric layer at an region including an input port of the waveguide, filling the additional vias or trenches with the light reflection or light absorption material, and etching the substrate from the backside of the substrate opposite to the dielectric layer to form an additional deep trench in the substrate at the region including the input port of the waveguide.

According to some embodiments, a method may include receiving a photonic integrated circuit that includes a substrate and a dielectric layer on the substrate, where the dielectric layer may include a light sensitive component. The method may further include etching a trench adjacent to the light sensitive component and in at least one of the dielectric layer or the substrate, depositing a thin adhesion layer on exposed surfaces of the trench, depositing a thin optical isolation layer on the thin adhesion layer, and depositing a first filling material layer on the thin optical isolation layer. The first filling material layer may fill the trench and may have a coefficient of thermal expansion (CTE) that matches a CTE of at least one of the substrate or the dielectric layer. In some embodiments, the method may also include depositing a second adhesion layer on the thin optical isolation layer before depositing the first filling material layer. In some embodiments, the method may also include planarizing the first filling material layer.

In some embodiments, the trench may be in both the substrate and the dielectric layer, and the CTE of the first filling material layer may match the CTE of the substrate. The method may further include etching a portion of the first filling material layer that fills the trench such that a top surface of the first filling material layer in the trench is aligned with an interface between the substrate and the dielectric layer, depositing a second filling material layer in the trench, and planarzing the second filling material layer. The second filling material layer may be characterized by a CTE that matches the CTE of the dielectric layer. In some embodiments, etching the portion of the first filling material layer may include etching the first filling material layer, the thin adhesion layer, and the thin optical isolation layer using a dry etching process, and the method may further include, before depositing the second filling material layer, depositing a second adhesion layer on the exposed surfaces of the trench and depositing a second optical isolation layer on the second adhesion layer.

Systems, devices, and methods disclosed herein can improve the signal-to-noise ratio of the photodetector by preventing undesired light from reaching the highly sensitive photodetector. As such, the photodetector may achieve a high sensitivity and may have a minimum amount of dead time. The light isolation structures may be fabricated using standard CMOS middle-of-line (MOL) or back-end-of-line (BEOL) processes or CMOS-compatible BEOL processes. Some isolations may be local isolations, and no additional global layers or materials may be needed in the stack-up, and hence no additional thermal loads may be added to the circuit and device. In addition, the light isolation structures may include a thin optical isolation layer and materials having coefficients of thermal expansion (CTEs) matching the CTEs of the materials in which the light isolation structures are formed. Thus, the overall CTE of the light isolation structures may match the CTEs of other portions of the photonic integrated circuit such that internal stress caused by thermal expansion mismatch may be reduced or minimized.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 4A is a cross-sectional view of an optical device including a photodetector and light isolation structures. FIG. 4B is a perspective view of the optical device of FIG. 4A. FIG. 4C is a top view of the optical device of FIG. 4A. FIG. 4D is a top view of a cross-section of the optical device of FIG. 4A.

DETAILED DESCRIPTION

Figure 1:
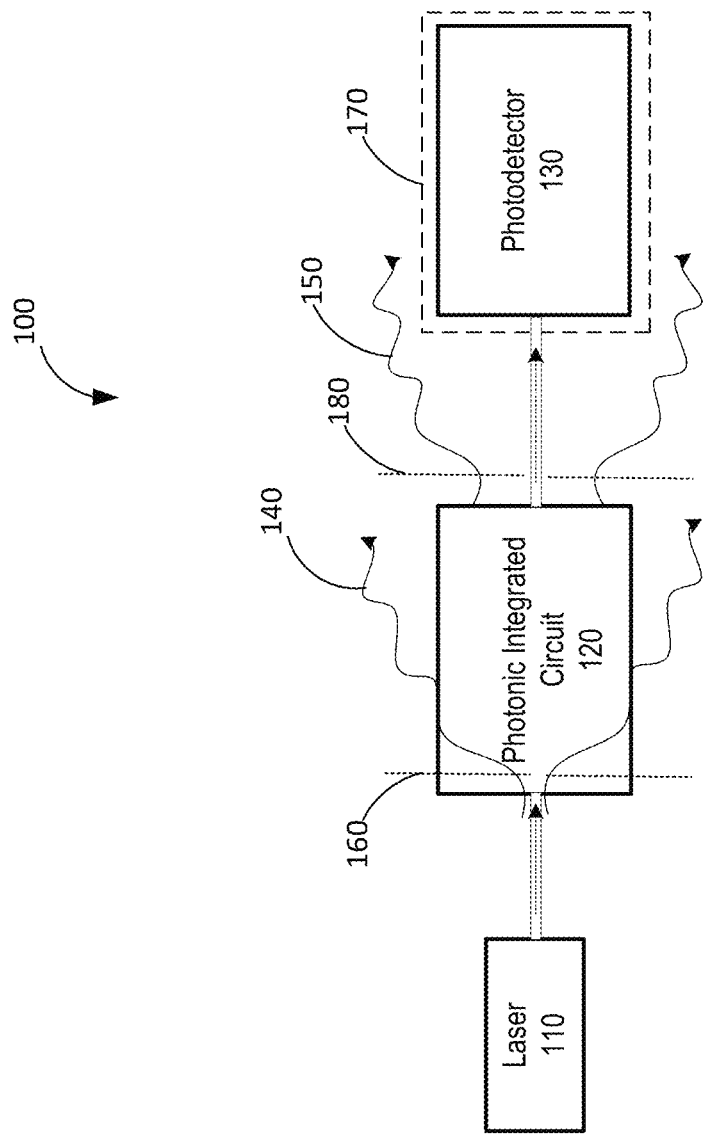
FIG. 1 is a simplified block diagram illustrating an example of an optical device including a photonic integrated circuit (PIC) and a highly sensitive photodetector according to certain embodiments.

Techniques disclosed herein relate generally to highly sensitive photodetectors. More specifically, techniques disclosed herein relate to techniques for preventing undesired background light (such as stray light or ambient light) from reaching a highly sensitive photodetector (e.g., a superconducting nanowire single-photon detector) in a photonic integrated circuit (PIC), in order to achieve a high sensitivity and a high signal-to-noise ratio (SNR). Various inventive embodiments are described herein, including methods, processes, systems, devices, and the like.

Photodetectors with high light sensitivity, such as single-photon detectors (SPDs, e.g., superconducting nanowire SPDs (SNSPDs)) used in many photonic quantum technologies, may be very sensitive to many kinds of light radiation. In many cases, the highly sensitive photodetectors may not achieve the sensitivity or SNR that they potentially can achieve due to various noise sources, such as background light including stray light in a system or ambient light entering the system.

According to certain embodiments, to improve the sensitivity and the SNR of a photodetector, the photodetector (e.g., SNSPD) may be optically isolated from background radiation (e.g., ambient light or stray light) using light isolation structures surrounding the photodetector. The light isolation structures may include light reflective or absorptive materials such that the light isolation structures may be optically opaque. In some embodiments, additional isolation structures may be added at any other locations in the PIC where background light may otherwise propagate and reach the photodetector, so as to reduce the number of stray photons that may reach the region of the photodetector. For example, because one main source of background or stray light in a photonic integrated circuit is the light reflected, scattered, or diffused at optical input and/or output ports (e.g., input or output waveguide couplers) of the PIC due to imperfect coupling of light into or out of the PIC, isolation structures may be used at the optical input and/or output ports to prevent stray light from entering the interior of the PIC. As such, the probability that any stray light or ambient light may enter the waveguides or reach the region of the photodetector may be significantly reduced. Furthermore, if any background light may reach the region where the photodetector is located, the local light isolation structures surrounding the photodetector may block the background light to prevent it from being detected by the photodetector. In various embodiments, the light isolation structures may be fabricated using standard CMOS back-end-of-line (BEOL) processes or other CMOS-compatible fabrication processes.

According to certain embodiments, to reduce the stress or damage caused by the coefficient of thermal expansion (CTE) mismatch between the light reflective or absorptive materials in the light isolation structures and other portions of the PIC when the PIC is cooled down from the processing temperatures (e.g., greater than about 700 K) to the operation temperatures (e.g., ≤ about 4 K), one or more thin opaque layers and adhesion layers may be deposited on the internal surfaces of trenches in the PIC for light isolation, and the trenches can then be filled with transparent or non-transparent materials having CTEs that approximately match the CTEs of the materials in which the trenches are formed. Thus, the light isolation structures may expand or contract at approximately the same rate with the rest of the PIC to reduce the internal stress and potential damages or defects in the PIC.

Several illustrative embodiments will now be described with respect to the accompanying drawings, which form a part hereof. The ensuing description provides embodiment(s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

FIG. 1 is a simplified block diagram illustrating an example of an optical device 100 including a photonic integrated circuit (PIC) 120 and a highly sensitive photodetector 130 according to certain embodiments. PIC 120 may include photonic circuits formed by waveguides and other active or passive optical components, such as filters, resonators, splitters, optical amplifiers, and the like. The optical device may include a light source, such as a laser 110, which may be an ultra-fast (e.g., picosecond or femtosecond) pulsed laser. In some embodiments, the light source may be an external source and may be connected to PIC 120 through, for example, one or more optical fibers. Light from the light source may be coupled into the waveguides in PIC 120 through a coupler, such as a grating coupler, an edge coupler, or the like. However, it may be difficult to achieve a very high coupling efficiency. For example, in many cases, the coupling efficiency may be less than 90%, less than 75%, less than 60%, or less than 50%. Therefore, a large amount of light from the light source may not enter the waveguides in PIC 120, and may instead be reflected, scattered, or diffused and become stray light 140. Stray light 140 may be reflected, refracted, diffracted, or otherwise deflected by structures or components in optical device 100, such as metal layers, interfaces between different materials, and the like. Therefore, a portion of stray light 140 may eventually reach photodetector 130. In addition, some portions of PIC 120 may also leak light from the desired path. For example, light may be coupled out of a waveguide, instead of being guided within the photonic circuit to reach photodetector 130, for example, when the waveguide has a sharp turn or when there are defects in the waveguide or other photonic circuits. Light leaked out from the photonic circuits may become stray light 150, which may also be deflected at least partially to photodetector 130. In some embodiments, ambient light may also enter PIC 120, for example, through the oxide layers and/or be reflected by metal layers.

Photodetector 130 may be a highly sensitive photodetector, such as a single-photon detector. For example, in some embodiments, photodetector 130 may include a superconducting nanowire single-photon detector that can detect individual photons. In one embodiments, photodetector 130 may include a waveguide coupled to a superconducting nanowire, such as a niobium-germanium nanowire, which may have a ultralow resistance in the superconducting state. The superconducting nanowire may be photosensitive or photoactive, such as absorptive for photons. For example, photons passing through the waveguide may be absorbed by the superconducting nanowire and cause the superconducting nanowire to become non-superconducting (i.e., changing resistance or impedance). The resistance or impedance change in the nanowire may be converted into an electrical detection signal (e.g., a current or voltage signal) that indicates one or more photons are detected.

When at least a portion of stray light 140 and 150 reaches photodetector 130, it may cause the superconducting nanowire to change state, and photodetector 130 may generate a detection signal indicating that one or more photons are detected even through no photon reaches the superconducting nanowire from the waveguide, or the magnitude of the detection signal may not correctly indicate the number of photons reaching the photodetector from the waveguide. Thus, false detection signals or incorrect (e.g., noisy) detection signals may be generated by photodetector 130, which may reduce the effective sensitivity or SNR of photodetector 130.

According to certain embodiments, light isolation structures may be added at different locations of optical device 100 to block the stray light or ambient light from reaching photodetector 130. For example, an isolation structure 160 may be added at the input port of PIC 120, an isolation structure 170 may be fabricated to surround photodetector 130, and an isolation structure 180 may be added anywhere in optical device 100 where background light may otherwise propagate. More details of some embodiments of the light isolation structures and their fabrication processes are described in the following examples.

Figure 2:
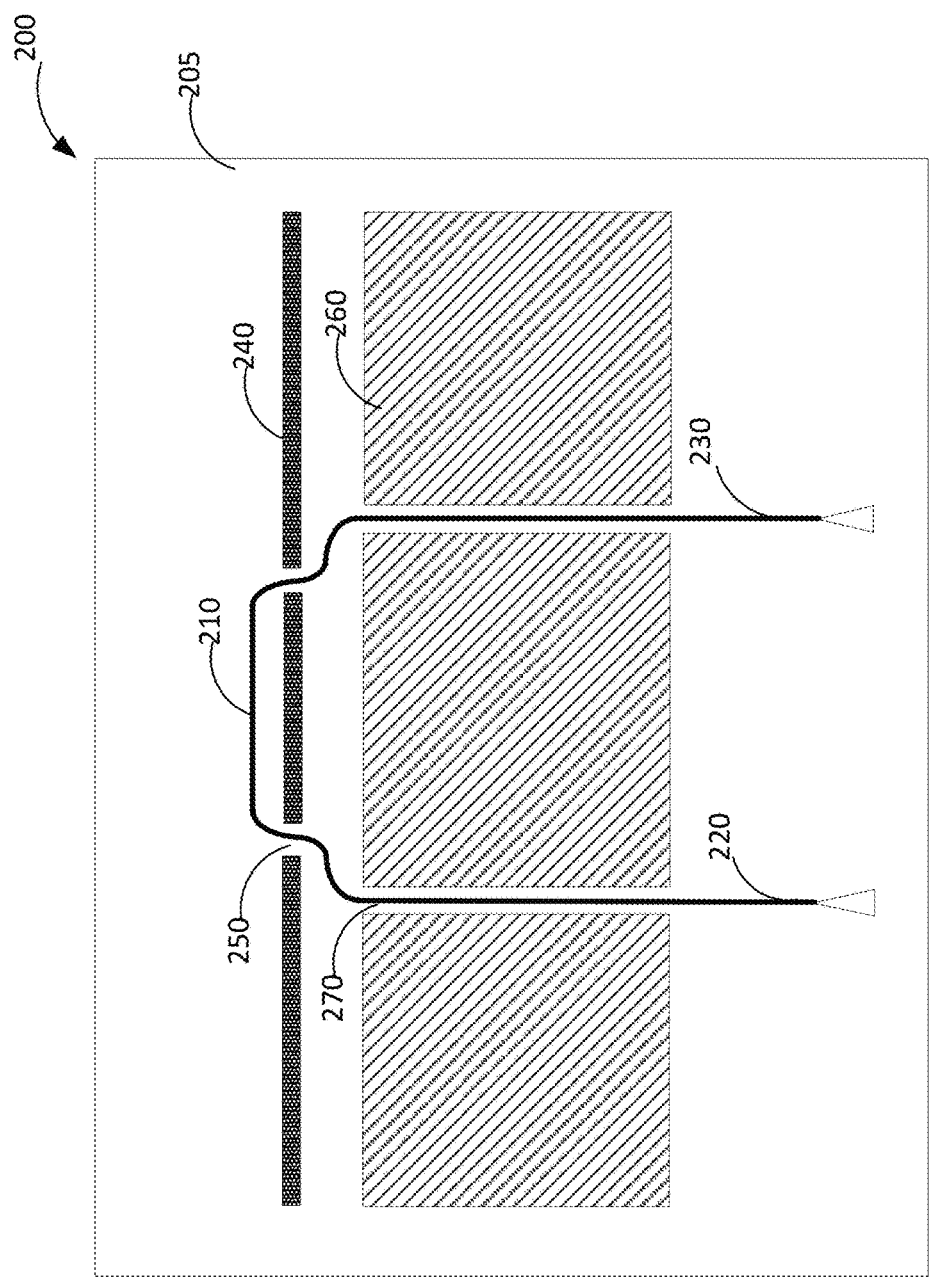
FIG. 2 illustrates an example of stray light isolation at input and/or output ports of a photonic integrated circuit according to certain embodiments.

FIG. 2 illustrates an example of stray light isolation at input and/or output ports of a photonic integrated circuit 200 according to certain embodiments. FIG. 2 shows a cross-section view of PIC 200, which may include a waveguide 210 fabricated on a substrate 205 (e.g., a silicon handle wafer). PIC 200 may also include an input port 220 for waveguide 210 and an output port 230 for waveguide 210. Waveguide 210 may carry light from input port 220 into the interior of PIC 200, where some photosensitive components may be located, or may guide light out of PIC 200 through output port 230.

As described above, light may not be perfectly coupled into or out of waveguide 210 at input port 220 or output port 230. A significant portion of input light or output light may enter PIC 200 through paths other than waveguide 210. In some cases, in each laser pulse, about $10^{12}$ photons may enter PIC 200 as stray light. To prevent these photons from reaching the interior of PIC 200, one or more light isolation structure may be fabricated at the input port and/or the output port. For example, as illustrated in FIG. 2, PIC 200 may include one or more metal trenches 240 and one or more deep trenches 260 that may act as isolation structure 160 shown in FIG. 1. Metal trenches 240 may include a metal layer that is sufficiently thick to block (e.g., reflect or absorb) incident photons. Metal trenches 240 may act as a mirror-like barrier and may extend from, for example, metal 1 (M1, which may be about 1 μm above waveguide 210), down to substrate 205 (which may be about 2-3 μm below waveguide 210) to block light that may propagate in the cladding of waveguide 210 from reaching the interior of PIC 200. Deep trenches 260 may extend through substrate 205 of PIC 200, and may be empty (i.e., air gaps) or may be filled with reflective or absorptive materials to at least partially reflect or absorb incident photons that may propagate in or may be scattered from substrate 205, such that the photons may not enter the cladding of the waveguide.

Gaps 250 may exist between adjacent metal trenches 240 such that waveguide 210 may pass through the gaps between metal trenches 240. Gaps 270 may exist between adjacent deep trenches 260 such that waveguide 210 may be supported by the substrate at gaps 270. As shown in FIG. 2, gaps 250 and gaps 270 may not be aligned and may be offset from each other by a certain distance, such that gaps 250 may not be in the line of sight of stray photons from input port 220, and thus stray photons from input port 220 may not pass though gaps 250 and may instead be blocked by metal trenches 240.

Figure 3:
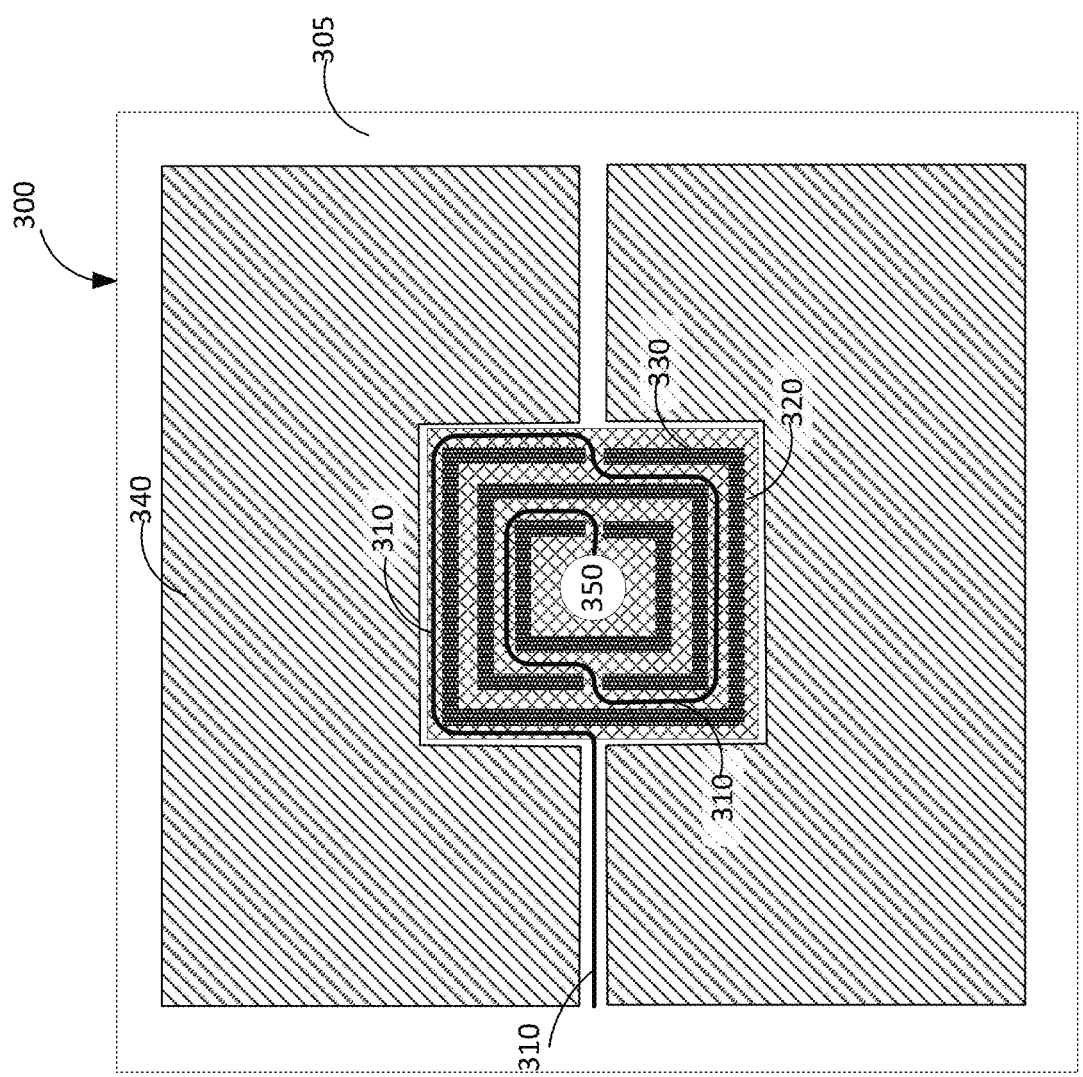
FIG. 3 illustrates an example of locally isolating a photodetector using various isolation structures according to certain embodiments.

FIG. 3 illustrates an example of locally isolating a photodetector 350 using various isolation structures in a photonic integrated circuit 300 according to certain embodiments. PIC 300 may include a substrate 305 (e.g., a silicon handle wafer). A waveguide 310 may be formed on substrate 305, where waveguide 310 may include multiple turns to change directions. Light isolation structures, such as a top metal cover 320, metal trenches 330, and deep trenches 340, may be fabricated in PIC 300 to surround and isolate waveguide 310 and photodetector 350. The light isolation structures shown in FIG. 3 may be a specific embodiment of isolations structure 170 of FIG. 1, and may form an isolation structure that may be compared to a castle-like structure.

As illustrated in FIG. 3, waveguide 310 may carry signal light from photonic circuits in PIC 300 to photodetector 350 (e.g., an SNSPD), where the signal light may be detected. Similar to deep trenches 260, deep trenches 340 may include an air gap that passes completely through substrate 305 or may be filled with reflective or absorptive materials. In some embodiments, deep trenches 340 may pass partially through substrate 305. Deep trenches may isolate photodetector 350 from light that may propagate in or may be scattered from substrate 305. Metal trenches 330 may be similar to metal trenches 240 and may create a mirror-like barrier that may extends from M1 down to substrate 305 as described above with respect to FIG. 2. In some embodiments, metal trenches 330 may include multiple nested rings centered around photodetector 350, where an inner ring may be enclosed by one or more outer rings. Each ring may include an opening where waveguide 310 may pass through. The opening in each ring may be on a different side (e.g., an opposite side or an adjacent side) with respect to the opening in an adjacent ring. Metal trenches 330 may block light that may propagate in the cladding of waveguide 310 from reaching photodetector 350. Top metal cover 320 may serve as a roof of the light isolation structure, which may be compared to a castle-like structure, and may prevent light from reaching photodetector 350 from the top of photodetector 350 and PIC 300.

Figure 4:
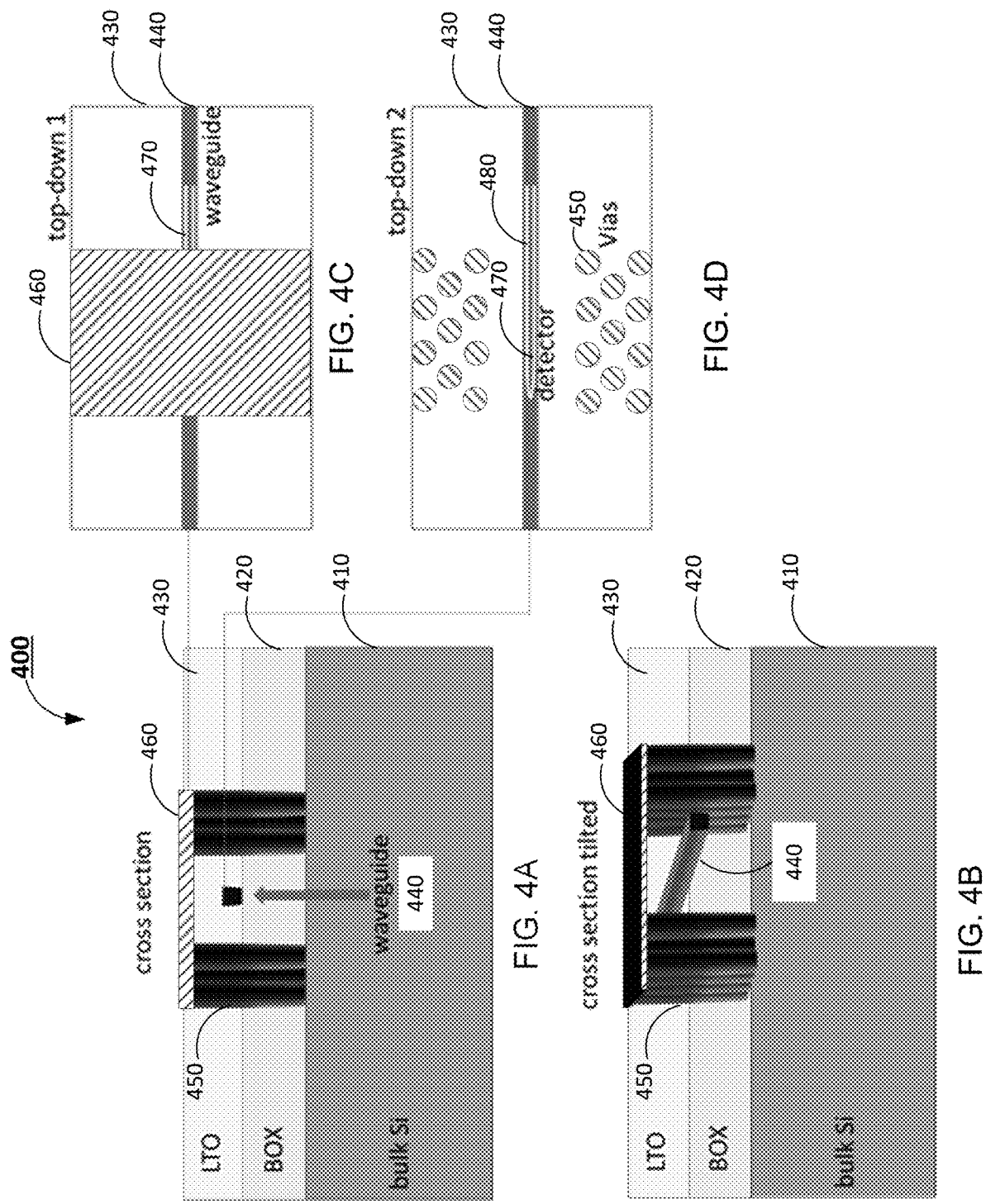
FIGS. 4A-4D illustrate another example of locally isolating a photodetector using various isolation structures in an optical device according to certain embodiments.

FIGS. 4A-4D illustrate another example of locally isolating a photodetector 470 using various isolation structures in an optical device 400 according to certain embodiments. FIG. 4A is a cross-sectional view of optical device 400 including photodetector 470 and light isolation structures surrounding photodetector 470. FIG. 4B is a perspective view of optical device 400 shown in FIG. 4A. Optical device 400 may include a substrate 410 (e.g., a silicon handle wafer), a barrier oxide (BOX) layer 420 (e.g., silicon dioxide), a waveguide 440 formed on top of BOX layer 420, and a low temperature oxide (LTO) layer 430 covering waveguide 440. Optical device 400 may also include an array of vias 450 and a top metal cover 460 that may be formed on metal 1 layer.

FIG. 4C is a top view of optical device 400 of FIG. 4A. FIG. 4C shows top metal cover 460 covering photodetector 470 from the top such that background light may not reach photodetector 470 from the top, where top metal cover 460 may be a part of the metal 1 layer.

FIG. 4D is a top view of a cross-section of optical device 400 of FIG. 4A. FIG. 4D shows the arrangement of the array of vias 450 and photodetector 470. As illustrated, the array of vias 450 may be arranged in a two-dimensional array, where vias in one row (or column) may be offset from vias in adjacent rows (or columns) such that the array of vias may effectively form a wall. Photodetector 470 may include a photoactive nanowire 480 (e.g., a niobium-germanium nanowire) on waveguide 440.

Figure 5:
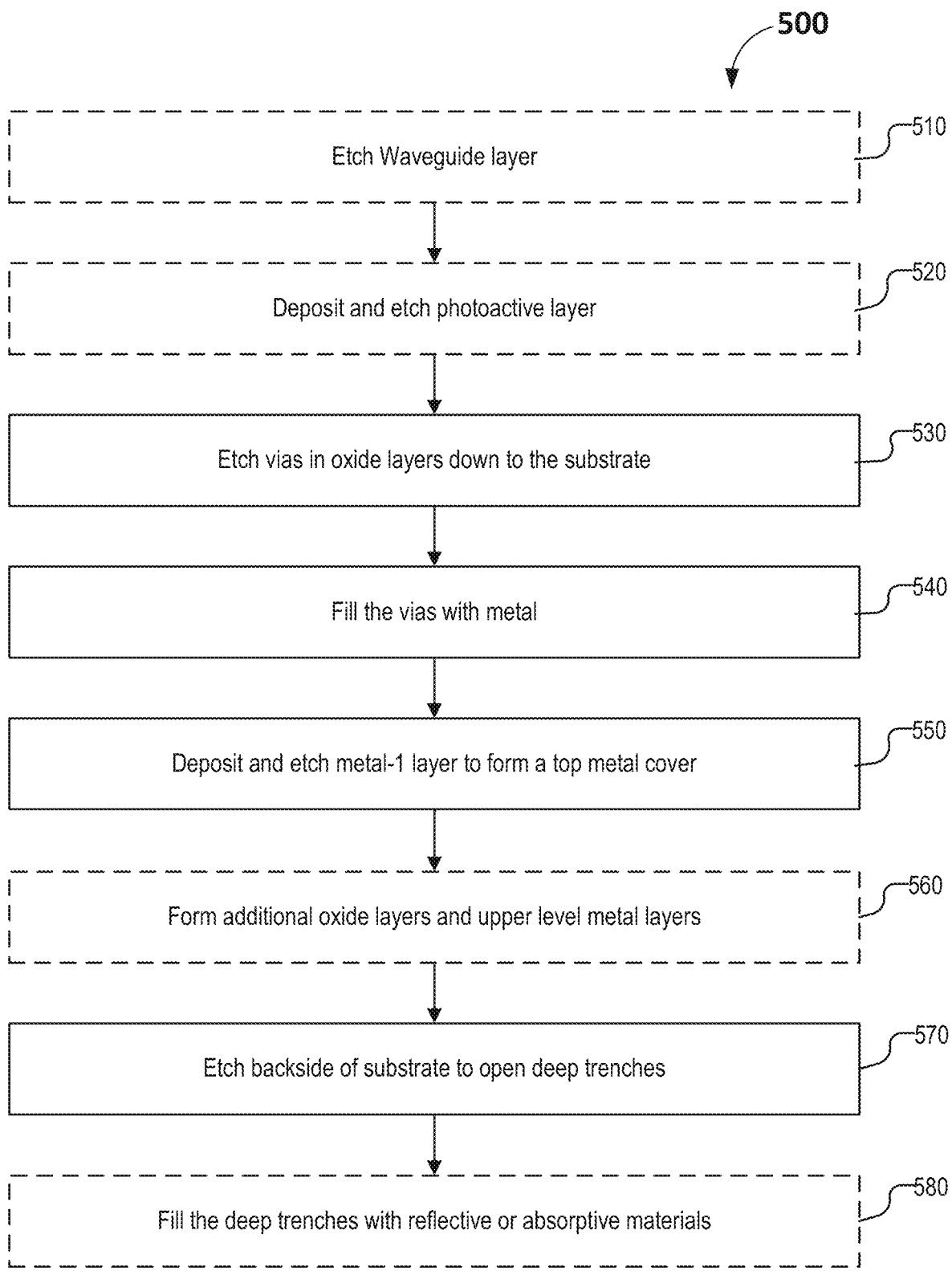
FIG. 5 is a flow chart illustrating an example method of fabricating various light isolation structures in a photonic integrated circuit according to certain embodiments.

FIG. 5 is a flow chart 500 illustrating an example method of fabricating various light isolation structures in a photonic integrated circuit according to certain embodiments. Even though FIG. 5 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation.

Optionally, at block 510, a waveguide layer may be formed on a barrier oxide layer of a PIC, such as BOX layer 420 shown in FIGS. 4A and 4B. The waveguide layer may be patterned and etched using, for example, photolithography techniques, to form the waveguide core and/or input/output couplers. At block 520, a photoactive layer, such as a niobium-germanium layer, may be deposited on top of the waveguide layer. The photoactive layer may be patterned and etched to form a nanowire on an area of the waveguide core. Processing at block 510 and block 520 may be part of the front end of line processes in the CMOS processes.

Figure 6:
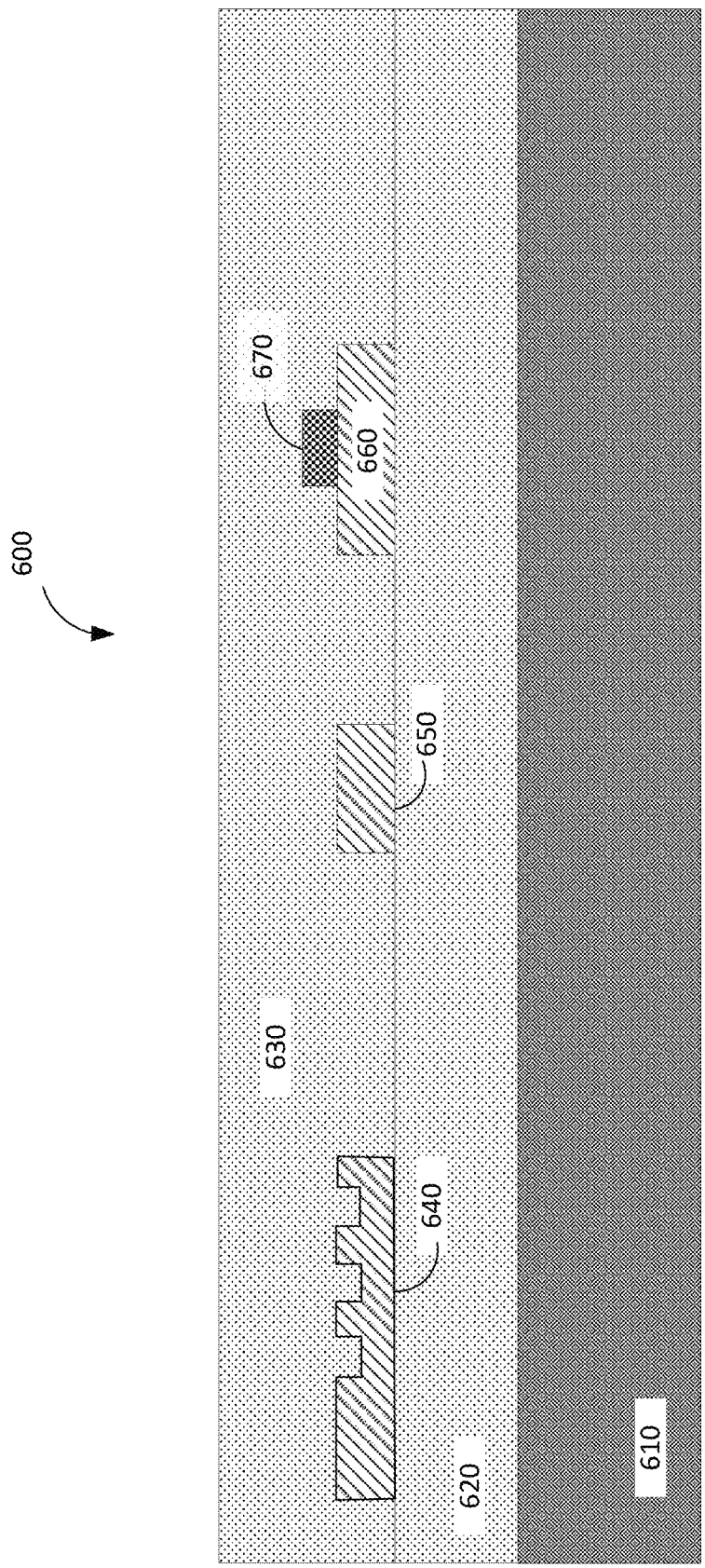
FIG. 6 is a cross-sectional view of an example of a photonic integrated circuit including a photodetector and manufactured using front end of line processes according to certain embodiments.

FIG. 6 is a cross-sectional view of an example of a photonic integrated circuit 600 including a photodetector manufactured using the front end of line processes at blocks 510 and 520 according to certain embodiments. PIC 600 may include a substrate 610 (e.g., a silicon handle wafer), a BOX layer 620 formed on substrate 610, various devices (e.g., optical input/output coupler 640, waveguide 650, and a photodetector including a waveguide 660 and a nanowire 670 including a photoactive material) on a device layer, and an oxide layer 630 covering the device layer. Optical input/output coupler 640 may include a grating coupler. Oxide layer 630 and BOX layer 620 may act as the cladding of waveguide 650. In one example, oxide layer 630 may have a thickness of about 1 µm.

At block 530, vias or trenches may be etched in the oxide layers down to the substrate. For example, a patterned mask layer may be formed on the oxide layers (e.g., the LTO layer and BOX layer), and selective wet or dry etching techniques may be used to etch vias (holes) or trenches in the oxide layers, which may have a total thickness of, for example, 3-4 µm.

Figure 7:
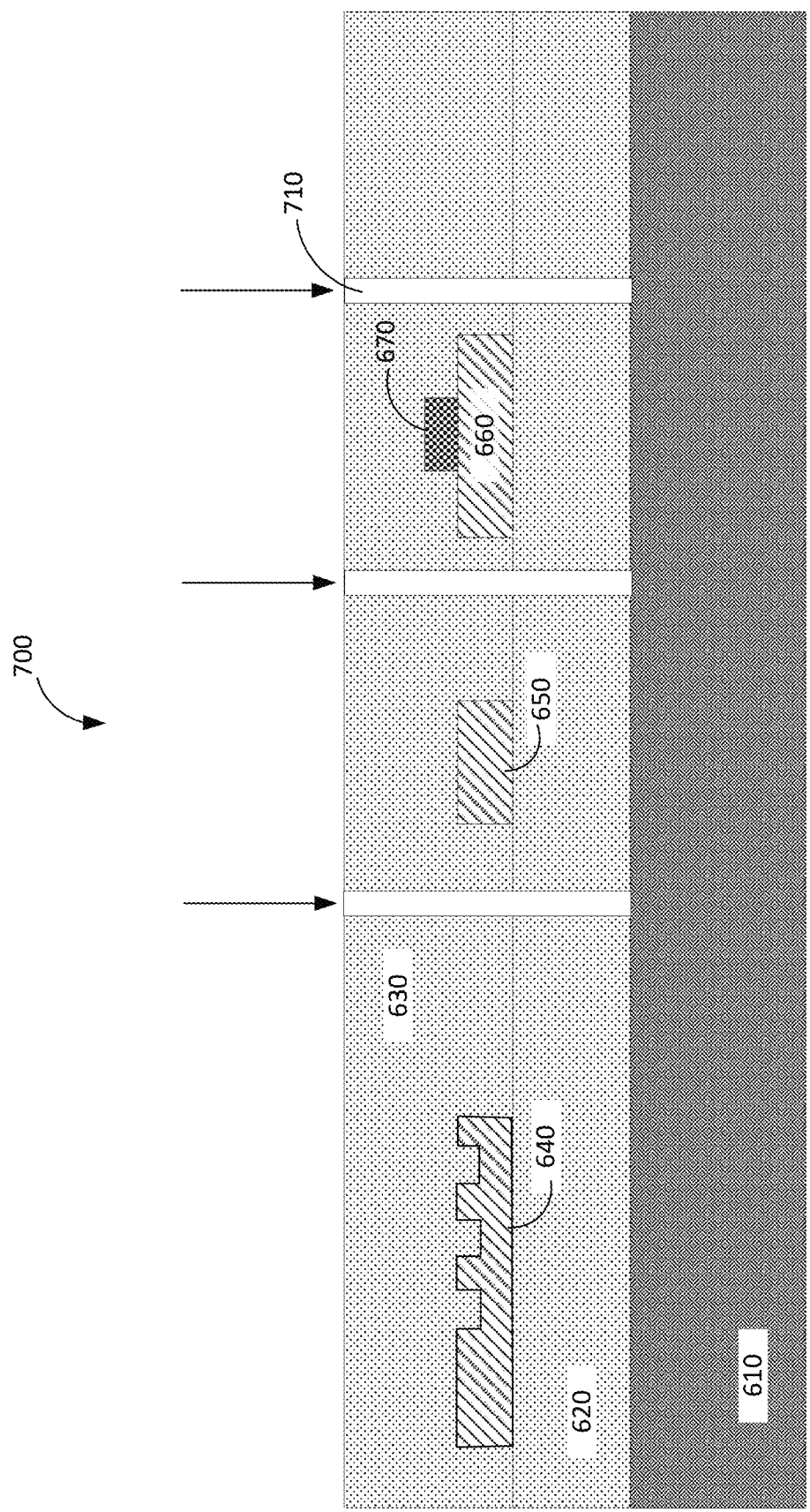
FIG. 7 is a cross-sectional view of an example of a photonic integrated circuit with vias or trenches etched in the oxide layer using back-end-of-line processes according to certain embodiments.

FIG. 7 is a cross-sectional view of an example of a photonic integrated circuit 700 with vias or trenches 710 etched in oxide layers using back-end-of-line (BEOL) processes at block 530 according to certain embodiments. PIC 700 may be made from PIC 600. Vias or trenches 710 may be etched through oxide layer 630 and BOX layer 620 down to substrate 610.

At block 540, the vias or trenches may be filled with reflective or absorptive materials, such as metal materials. For example, metal layers may be deposited on the oxide layers and selectively etched in one or more cycles to form metal plugs in the vias or trenches.

Figure 8:
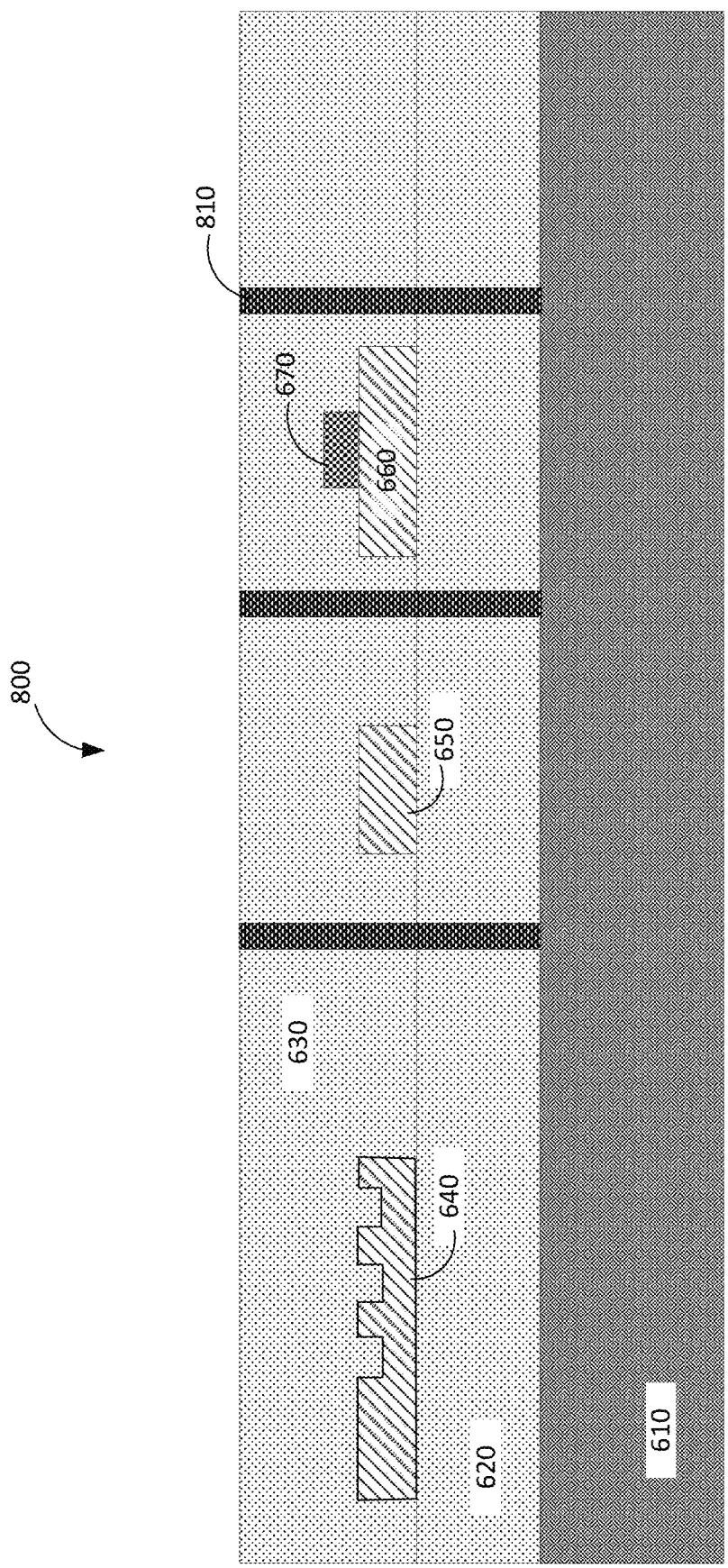
FIG. 8 is a cross-sectional view of an example of a photonic integrated circuit with the vias or trenches etched in the oxide layer filled with reflective or absorptive materials (e.g., metals) according to certain embodiments.

FIG. 8 is a cross-sectional view of an example of a photonic integrated circuit 800 with the vias or trenches etched in the oxide layers filled with reflective or absorptive materials (e.g., metals such as copper, aluminum, cobalt, tungsten, etc.) using the BEOL process at block 540 according to certain embodiments. PIC 800 may be made from PIC 700, where vias or trenches 710 may be filled with metal plugs 810.

At block 550, standard CMOS BEOL processing techniques may be used to deposit a metal 1 layer on the oxide layers and etch the metal 1 layer to leave a top metal cover in an area on top of the photodetector. The top metal cover may be aligned with the vias or trenches that are filled with reflective or absorptive materials, such as metals. Therefore, the top metal cover and the vias or trenches may block background light from at least 3 (e.g., top, left, and right) or 5 (e.g., top, left, right, front, and rear) directions.

Figure 9:
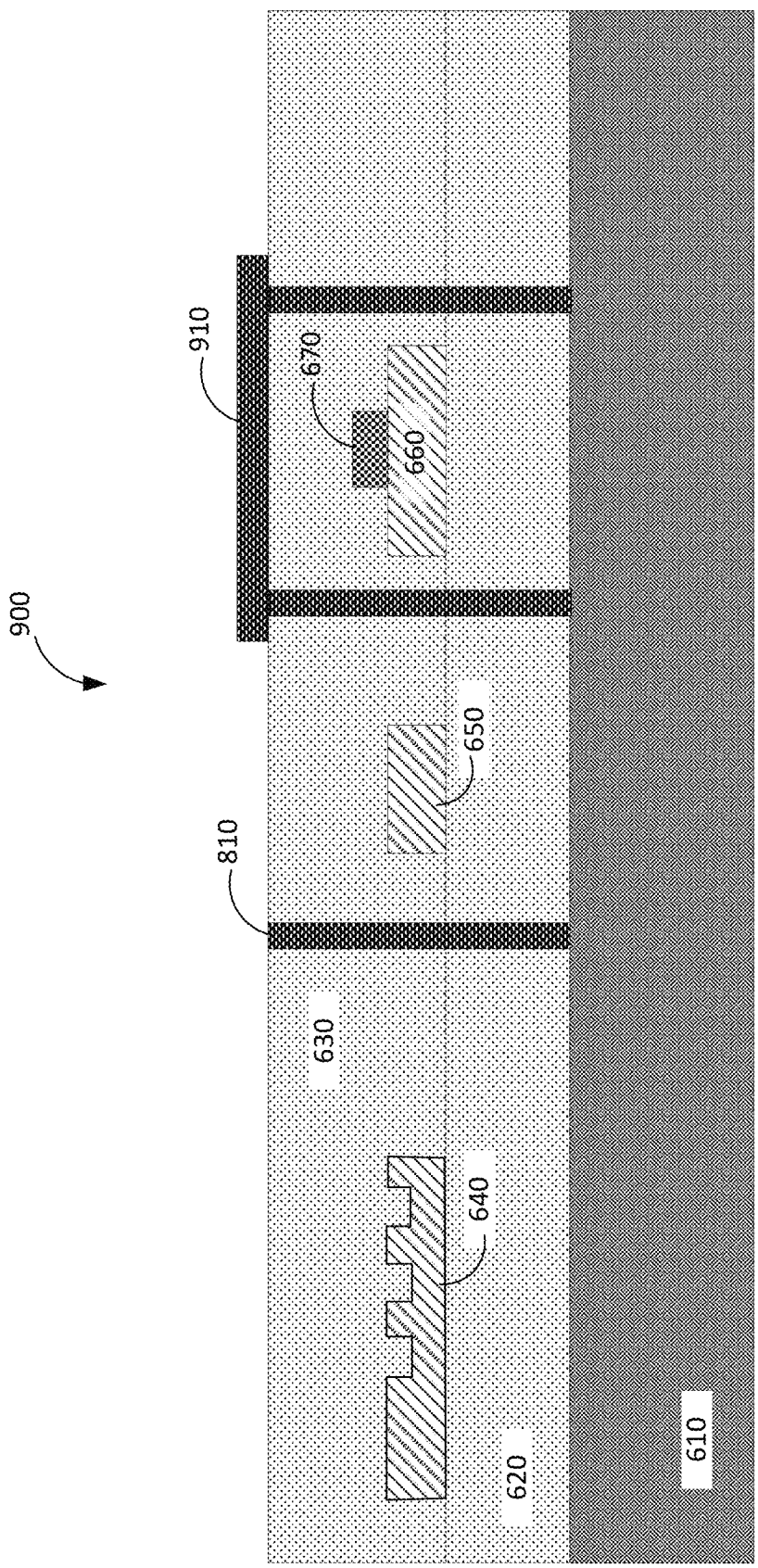
FIG. 9 is a cross-sectional view of an example of a photonic integrated circuit with a metal cover fabricated on a metal layer for locally isolating the photodetector according to certain embodiments.

FIG. 9 is a cross-sectional view of an example of a photonic integrated circuit 900 with a top metal cover 910 fabricated as part of a metal layer for locally isolating the photodetector using the BEOL process at block 550 according to certain embodiments. PIC 900 may be made from PIC 800 and may include the additional top metal cover 910 formed as part of the metal 1 layer. Top metal cover 910 may be positioned above (e.g., on top of) the photodetector that includes waveguide 660 and nanowire 670. Top metal cover 910 may be in contact with metal plugs 810 in vias or trenches 710 to block light from top, left, and right directions in the 2-D cross-sectional view.

Optionally, at block 560, other BEOL processes may be performed to form, for example, additional dielectric (e.g., oxide) layers and upper metal layers (e.g., metal 2, metal 3, etc.). The BEOL processes may include standard CMOS BEOL processes.

Figure 10:
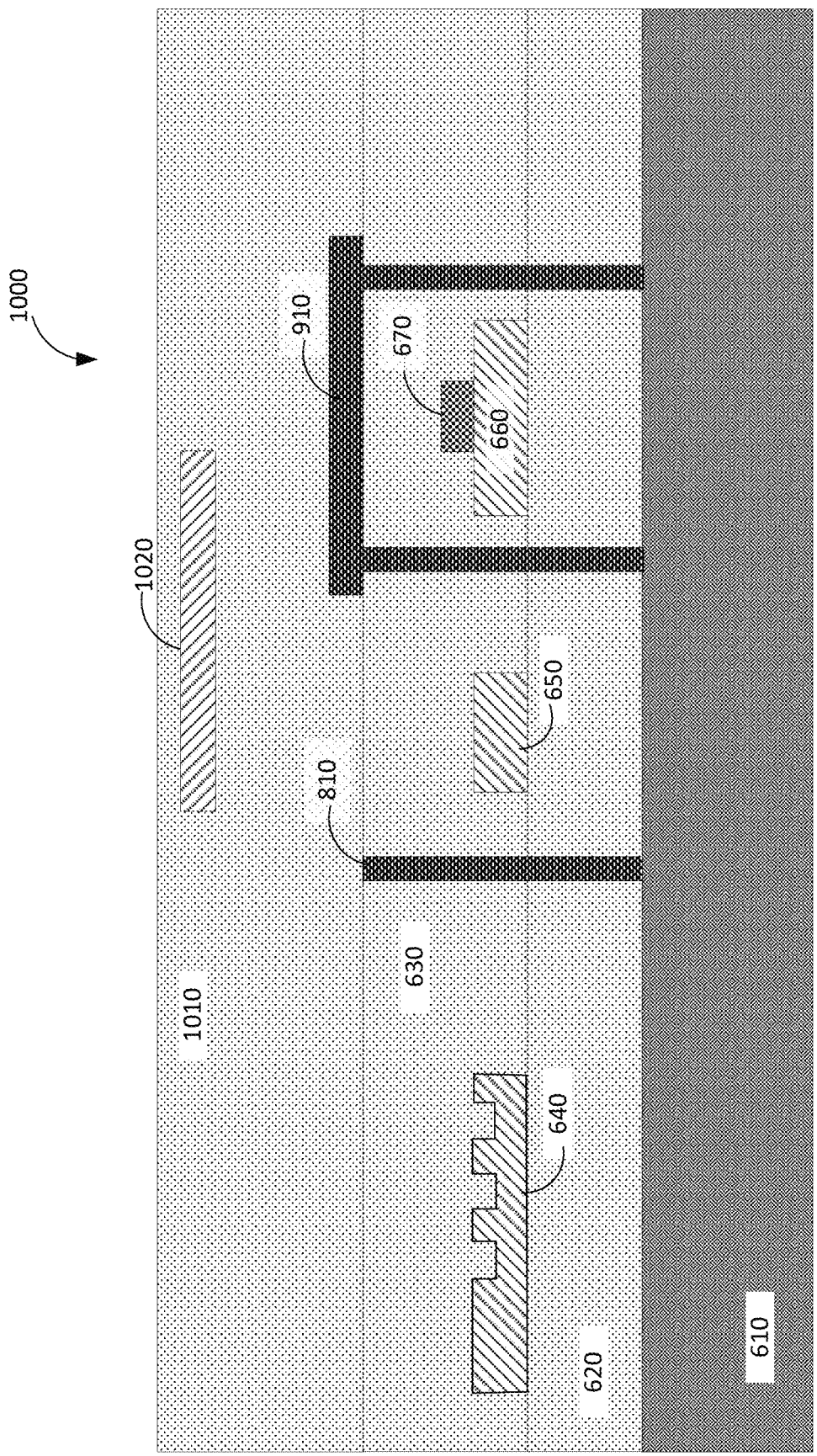
FIG. 10 is a cross-sectional view of an example of a photonic integrated circuit after additional BEOL processes according to certain embodiments.

FIG. 10 is a cross-sectional view of an example of a photonic integrated circuit 1000 after the additional BEOL processes at block 560 according to certain embodiments. PIC 1000 may be made from PIC 900 and may include additional metal layers 1010 and upper level metal layers, such as metal layer 1020.

At block 570, the substrate may be etched from the backside to form deep trenches in the substrate from the backside. The deep trenches may reflect photons propagating within the substrate at interfaces between the substrate material and the air gap. For example, total internal reflection may occur when photons are incident at a certain angle on the interface from the substrate material to the air gap.

Figure 11:
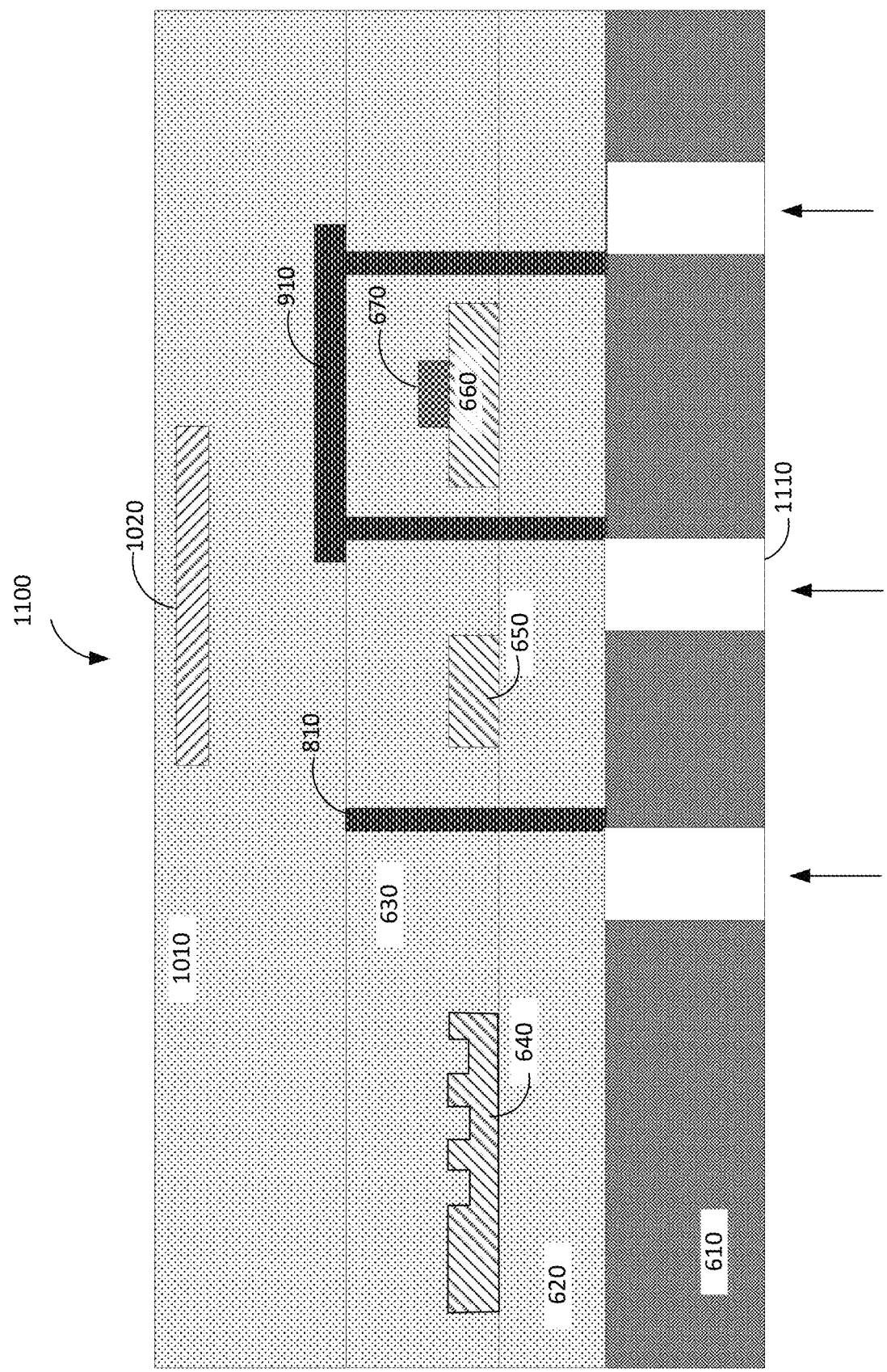
FIG. 11 is a cross-sectional view of an example of a photonic integrated circuit including deep trenches etched in a substrate of the photonic integrated circuit according to certain embodiments.

FIG. 11 is a cross-sectional view of an example of a photonic integrated circuit 1100 including trenches 1110 etched in a substrate of the photonic integrated circuit using the BEOL process at block 570 according to certain embodiments. PIC 1100 may be made from PIC 1000 and may include trenches 1110 in substrate 610. Trenches 1110 may be offset from metal plugs 810. For example, trenches 1110 may be slightly farther away from the photodetector than metal plugs 810 to prevent light from circumventing metal plugs 810 from substrate 610 and bottom side of BOX layer 620 and reaching the photodetector.

Optionally, at block 580, the deep trenches may be filled with reflective or absorptive materials that may block light, such as metal materials.

Figure 12:
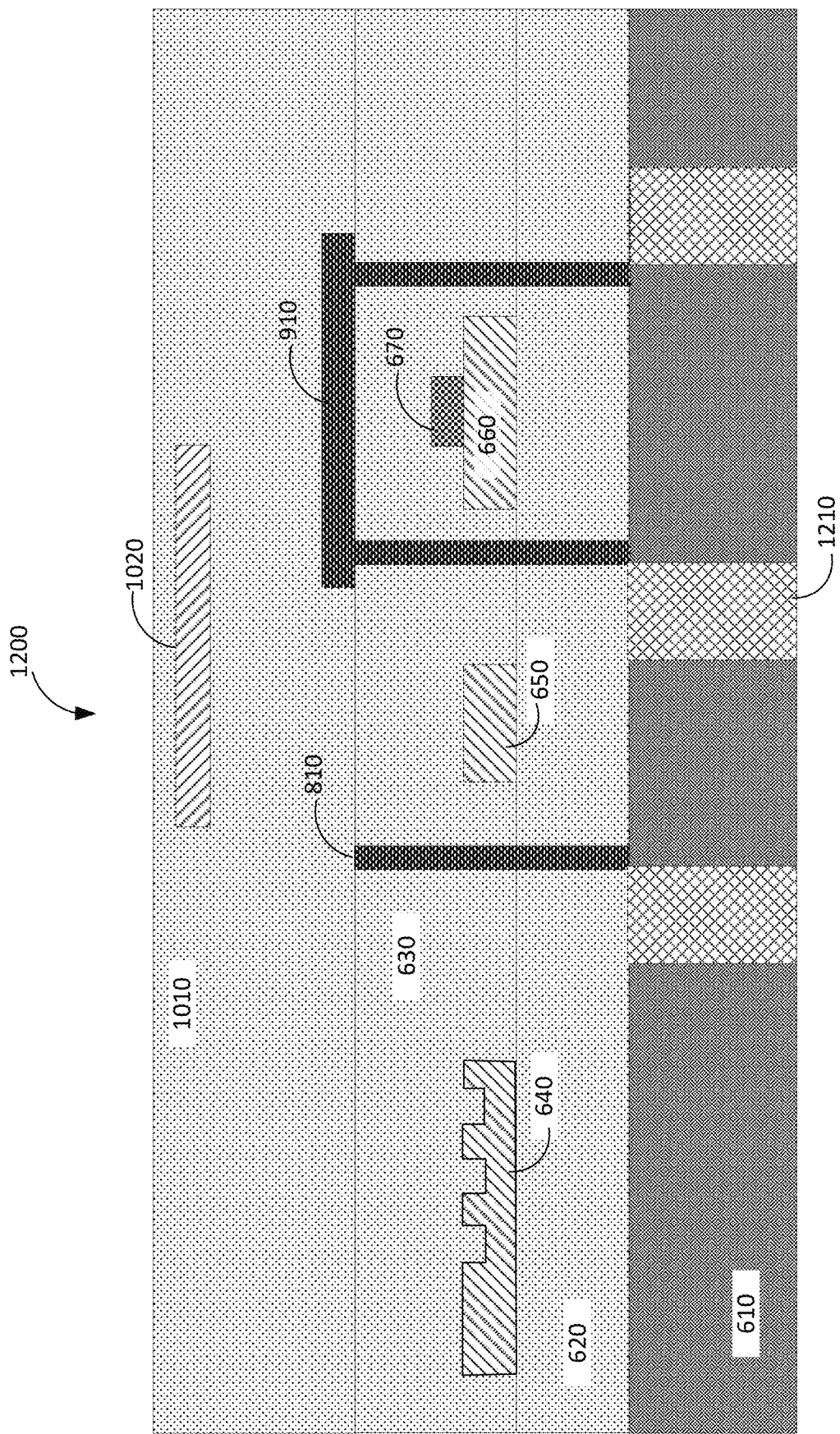
FIG. 12 is a cross-sectional view of an example of a photonic integrated circuit including deep trenches filled with reflective or absorptive materials in a substrate of the photonic integrated circuit according to certain embodiments.

FIG. 12 is a cross-sectional view of an example of a photonic integrated circuit 1200 including the deep trenches in the substrate filled with reflective or absorptive materials using the process at block 580 according to certain embodiments. PIC 1200 may be made from PIC 1100, and may include reflective or absorptive materials 1210, such as metal materials, filled in trenches 1110.

Figure 13:
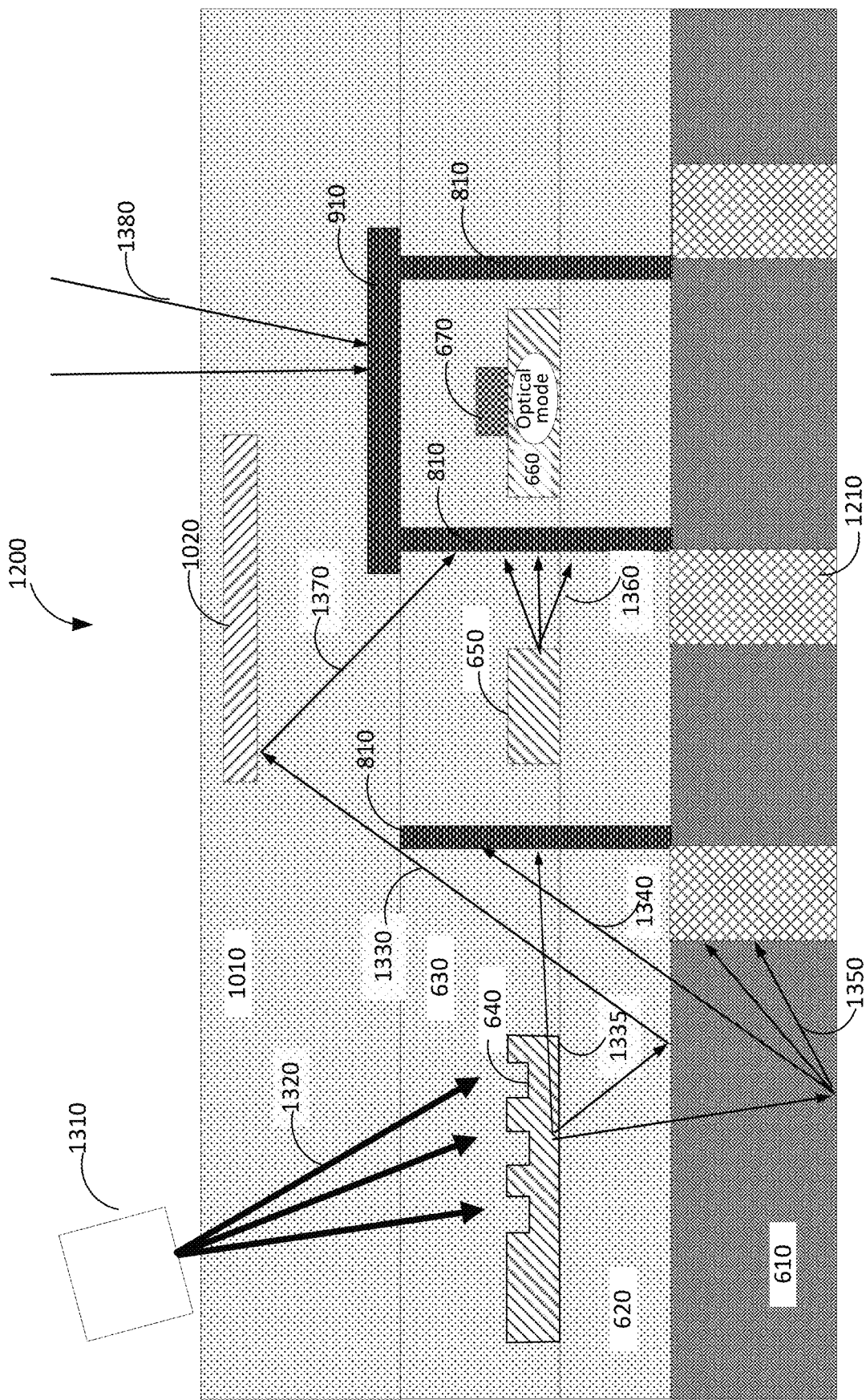
FIG. 13 is a cross-sectional view of an example of a photonic integrated circuit illustrating light isolation by various isolation structures in the photonic integrated circuit according to certain embodiments.

FIG. 13 is a cross-sectional view of photonic integrated circuit 1200 illustrating light isolation by various isolation structures in the photonic integrated circuit according to certain embodiments. Light from a laser may be sent to PIC 1200 through an input fiber 1310, which may include a collimator, such as a GRIN lens or a micro lens. Input light 1320 from input fiber 1310 may propagate through the oxide layers and may be partially coupled into the waveguides in PIC 1200 by optical input/output coupler 640, which may include slanted gratings in some embodiments.

Light that is not coupled into the waveguides by optical input/output coupler 640 may be scattered in various directions. For example, a portion of input light 1320 may be reflected at the interface between substrate 610 and BOX layer 620 as light 1330, which may be further reflected by metal layer 1020 as light 1370 that may be blocked by one of metal plugs 810. A portion of input light 1320 may be scattered as light 1335, which may propagate towards a metal plug 810 and blocked by the metal plug. A portion of input light 1320 may be scattered at the bottom surface of substrate 610, where one portion of scattered light 1350 may be blocked by the reflective or absorptive material 1210 in a trench 1110, and another portion of scattered light 1340 may be blocked by a metal plug 810.

Light 1360 scattered or otherwise leaked from waveguide 650 may also be blocked by a metal plug 810 from reaching the photodetector. Ambient light 1380 that may enter the oxide layers from the top or stray light reflected by various metal layers may be blocked by top metal cover 910 on top of the photodetector, and thus may not reach the photodetector either. In this way, only photons guided in waveguide 660 may reach the photodetector, and thus background noises can be significantly reduced or substantially eliminated. As such, a high sensitivity and a high SNR may be achieved by the photodetector.

In various embodiments, other dielectric layers used in CMOS processing may be used to replace one or more oxide layers (e.g., silicon dioxide layers) described above. For example, the dielectric layers may include silicon nitride, alkali halides, barium titanate, lead titanate, tantalum oxide, tungsten oxide, zirconium oxide, and the like.

Some of the above described processes, such as the oxide and metal deposition processes, may need to be performed at elevated temperatures, such as 700 K or higher. In addition, the PIC may need to be bonded to an electric integrated circuit and/or a printed circuit board at a high temperature. However, the superconducting nanowire in the single-photon detector may need to operate at cryogenic temperatures (e.g., ≤about 4 K) in order to be in the superconducting state. Thus, at least the regions surrounding the superconducting nanowire may need to be cooled down to the cryogenic temperatures during normal operations. As such, the light isolation structures adjacent to the superconducting nanowire may experience a large temperature change from the manufacturing environment to the operation environment.

As described above, reflective or absorptive materials, such as metals including copper, aluminum, cobalt, tungsten, or the like, may be used to fill the trenches, such as trenches 1110, in order to block the stray light or ambient light from reaching the sensitive single-photon detector. However, most metals, such as copper and tungsten, may have much higher coefficients of thermal expansion (CTEs) than silicon and $SiO_2$. Thus, when the PIC is cooled down from the processing temperatures (e.g., ≥700 K) to the operation temperature (e.g., ≤4 K), there may be a large difference between the amount of thermal contraction of the filling materials in the trenches and the amount of thermal contraction of other materials of the PIC, and hence a large amount of induced strain near the trenches that may impact the mechanical stability and performance of the PIC.

Figure 14B:
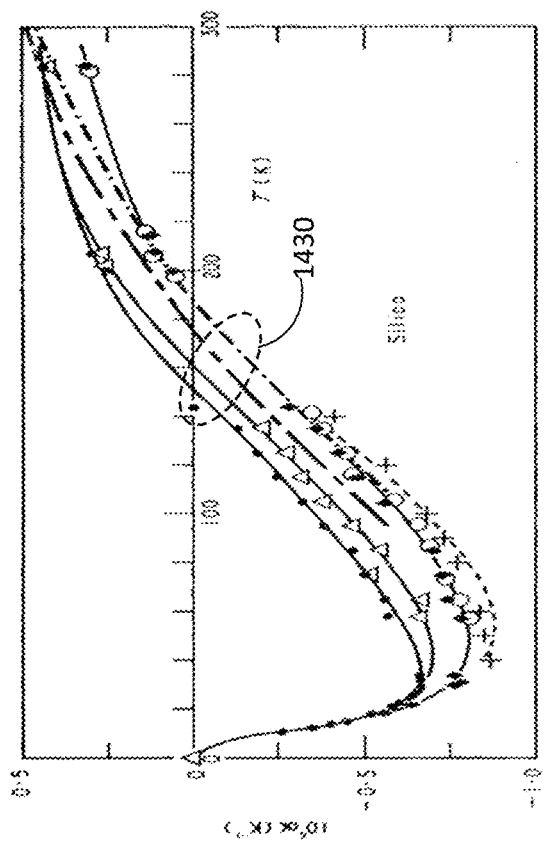
FIG. 14B illustrates the coefficient of thermal expansion of silicon oxide.
Figure 14A:
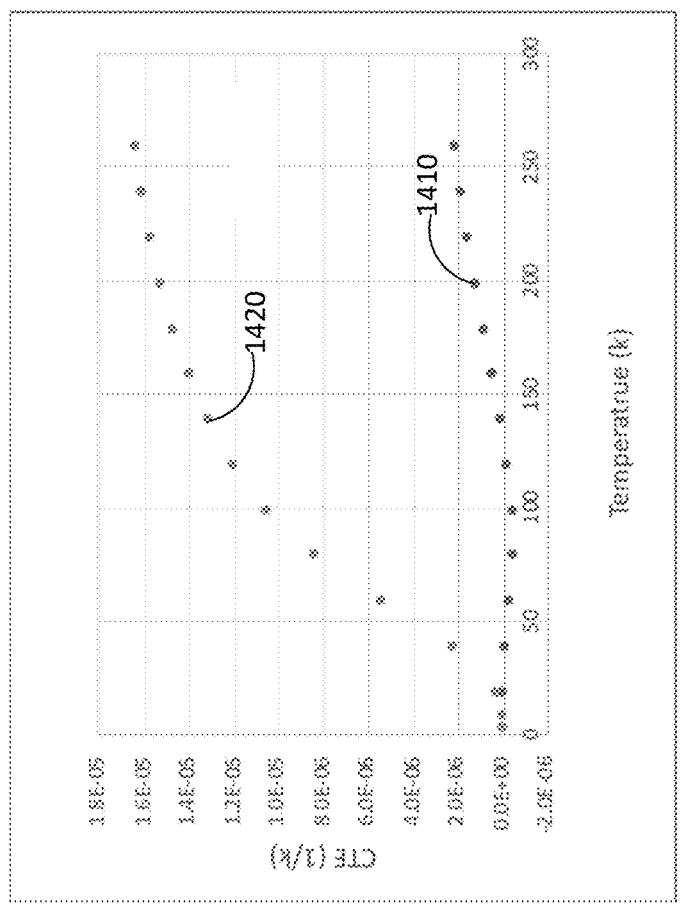
FIG. 14A illustrates the coefficient of thermal expansion (CTE) mismatch between silicon and copper.

FIG. 14A illustrates the CTE mismatch between silicon and copper. Curve 1410 shows the CTE of silicon, such as silicon substrate 610 shown in FIG. 13, as a function of temperature from near 0 K to about 273 K. The overall percentage of thermal expansion (or contraction) of silicon for a certain temperature change (e.g., between 0 K and 273 K) may be the area under curve 1410. Curve 1420 shows the CTE of copper, which may be used as the trench filling materials 1210 shown in FIG. 13, as a function of temperature from 0 K to about 273 K. The overall percentage of thermal expansion (or contraction) of copper for a certain temperature change (e.g., between 0 K and 273 K) may be the area under curve 1420. As shown in FIG. 14A, copper may have a much higher coefficient of thermal expansion than silicon at a given temperature. Thus, for a same temperature change, the overall percentage of thermal expansion (or contraction) of copper may be much larger than the overall percentage of thermal expansion (or contraction) of silicon. CTE of tungsten is smaller than copper but much greater than silicon, and therefore for the same temperature change, the overall percentage of thermal expansion (or contraction) of tungsten may be much larger than the overall percentage of thermal expansion (or contraction) of silicon. As such, if the size of the trenches and thus the size of the metal materials filling the trenches are relative large, the difference between the overall thermal expansion of the metal materials in the trenches and the overall thermal expansion of the adjacent silicon material may be large. Therefore, a large stress may be induced around the trenches, which may cause damages or defects in the PIC and/or may change the optical properties (e.g., optical loss, guided mode, polarization properties, etc.) of waveguides and other components in PIC.

FIG. 14B illustrates the coefficient of thermal expansion of silicon oxide. Curve 1430 shows the CTE of silicon oxide, such as BOX layer 620 or oxide layer 630 described above, as a function of temperature from 0 K to about 300 K. As illustrated, the CTE of silicon oxide at a temperature may be lower than the CTE of silicon at the same temperature, and may be much lower than the CTE of copper or tungsten at the same temperature. Thus, the CTE mismatch between copper, tungsten, and silicon oxide may be even larger than the CTE mismatch between copper and silicon.

Figure 15A:
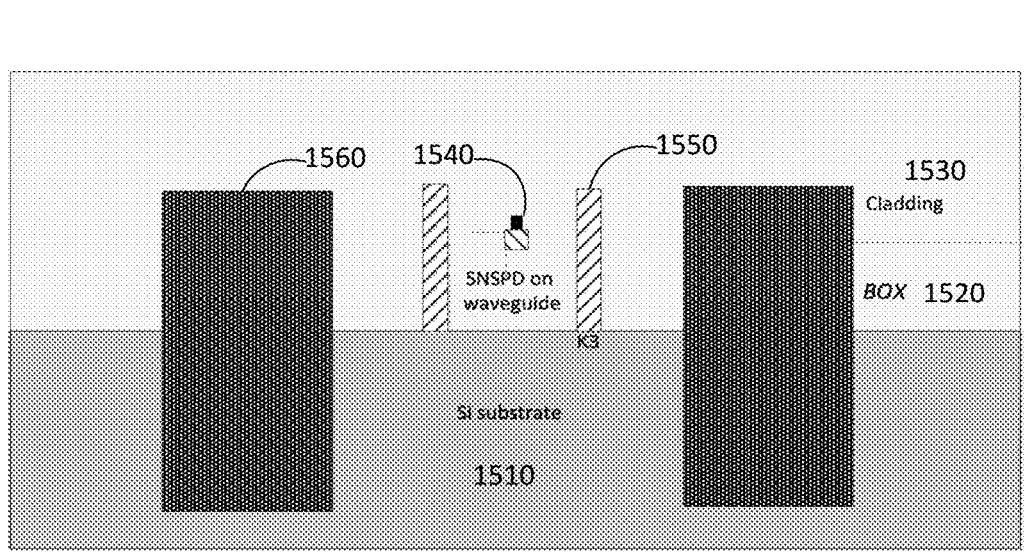
FIG. 15A is a cross-sectional view of an example of a photonic integrated circuit including trenches filled with reflective or absorptive optical isolation materials according to certain embodiments.

FIG. 15A is a cross-sectional view of an example of a photonic integrated circuit 1500 including trenches filled with reflective or absorptive optical isolation materials according to certain embodiments. As the PICs described above, photonic integrated circuit 1500 may include a silicon substrate 1510, a BOX layer 1520, and a cladding layer 1530 (e.g., a silicon oxide layer). A superconducting nanowire single-photon detector 1540 may be formed in BOX layer 1520 and cladding layer 1530. To isolate SNSPD 1540, metal plugs 1550 (similar to, e.g., metal plugs 810) may be formed in BOX layer 1520 and cladding layer 1530 adjacent to SNSPD 1540. Metal plugs 1550 may include, for example, vias or trenches filled with tungsten or other metals, metal alloys, or metal compounds. Additional light isolation structures 1560 may be formed in silicon substrate 1510, BOX layer 1520, and cladding layer 1530 to prevent stray light from reaching SNSPD 1540 in various directions and through various material layers, such as silicon substrate 1510. Light isolation structures 1560 may be filled with reflective or absorptive optical isolation materials, such as metals (e.g., copper or tungsten), metal alloys, or metal compounds (e.g., metal nitride).

As described above, because the size of light isolation structures 1560 may be relatively large, the thermal expansion of the metals in light isolation structures 1560 may be much larger than the thermal expansion of the silicon in silicon substrate 1510 and the silicon oxide in BOX layer 1520 and cladding layer 1530 when the temperature of photonic integrated circuit 1500 changes significantly. Therefore, a large mechanical stress may be introduced in photonic integrated circuit 1500.

According to certain embodiments, to reduce the stress and potential damages caused by the CTE mismatch between light isolation structures 1560 and other portions of PIC 1500 when PIC 1500 is cooled down from the processing temperatures (e.g., greater than 700 K) to the operation temperatures (e.g., ≤ about 4 K), one or more thin optical isolation layers (e.g., with a thickness less than 100 nm, such as ≤ about 50, 60, or 70 nm) may be deposited on the internal surfaces of the trenches for light isolation structures 1560 (which may have a linear dimension of a few microns or tens of microns), and the trenches can then be filled with materials having CTEs that approximately match the CTEs of the substrate or other layers in which the trenches are formed. The combination of the optical isolation layers in the light isolation structures may be optically opaque. Thus, light isolation structures 1560 including the thin optical isolation layer and the CTE matching filling materials may expand at approximately the same rate with the rest of the PIC to reduce the internal stress and potential damages or defects in the PIC.

Figure 15B:
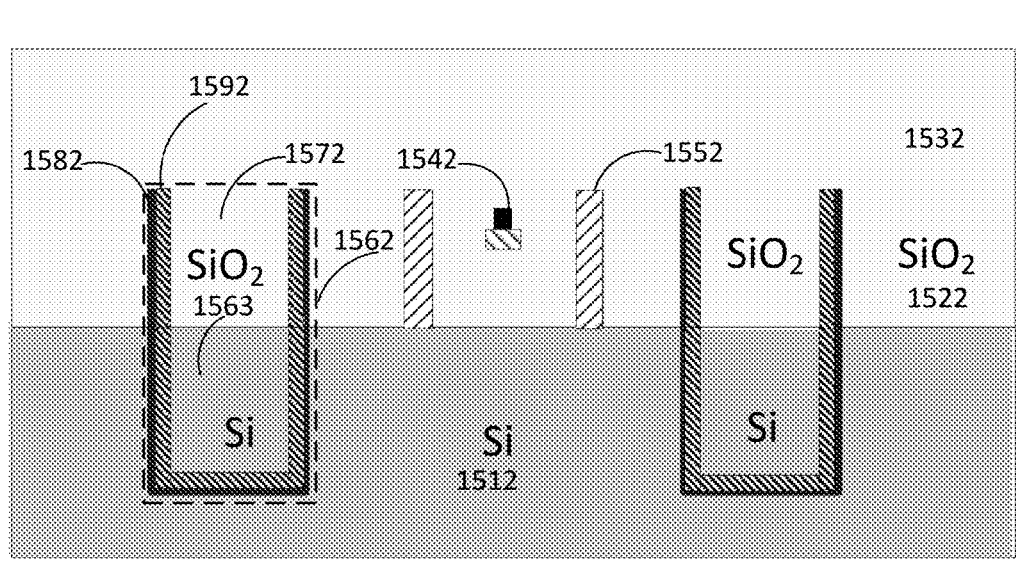
FIG. 15B is a cross-sectional view of an example of a photonic integrated circuit including trenches filled with a thin layer of an optical isolation material and CTE matching materials according to certain embodiments.

FIG. 15B is a cross-sectional view of an example of a photonic integrated circuit 1502 including trenches filled with a thin layer of an optical isolation material and CTE matching materials according to certain embodiments. As photonic integrated circuit 1500, photonic integrated circuit 1502 may include a silicon substrate 1512, a BOX layer 1522, and a cladding layer 1532 (e.g., a silicon oxide layer). A superconducting nanowire single-photon detector 1542 may be formed in BOX layer 1522 and cladding layer 1532. To isolate SNSPD 1542, metal plugs 1552 (similar to, e.g., metal plugs 810) may be formed in BOX layer 1522 and cladding layer 1532 adjacent to SNSPD 1542. Metal plugs 1552 may include, for example, vias or trenches filled with tungsten, or other metals, metal alloys, or metal compounds. Additional light isolation structures 1562 may be formed in silicon substrate 1512, BOX layer 1522, and cladding layer 1532 to prevent stray light or ambient light from reaching SNSPD 1542 in various directions and through various material layers, such as silicon substrate 1512.

Each light isolation structure 1562 may include an adhesion layer 1582 (e.g., a Ti layer with a thickness about 2 nm to about 10 nm) and an optical isolation layer 1592 (e.g., a TiN, TaN, ZrN, or WN layer with a thickness about 25 nm to about 60 nm) on each sidewall and the bottom surface of the trench forming light isolation structure 1562. The overall thickness of the two optical isolation layers 1592 in the two opposing sidewalls in light isolation structure 1562 may be, for example, about 50 nm to about 120 nm. Thus, the two optical isolation layers 1592, in combination, may be optically opaque. Adhesion layer 1582 may help to improve the adhesion between optical isolation layer 1592 and silicon substrate 1512 and the oxide layer (e.g., BOX layer 1522 and cladding layer 1532). A portion 1563 of light isolation structure 1562 within silicon substrate 1512 may be filled with polysilicon, and a portion 1572 of light isolation structure 1562 within BOX layer 1522 and cladding layer 1532 may be filled with silicon oxide. Thus, the portion of light isolation structures 1562 within silicon substrate 1512 (including adhesion layer 1582, optical isolation layer 1592, and portion 1563) may have a CTE approximately matching the CTE of silicon, while the portion of light isolation structures 1562 within BOX layer 1522 and cladding layer 1532 (including adhesion layer 1582, optical isolation layer 1592, and portion 1572) may have a CTE approximately matching the CTE of silicon oxide. Therefore, light isolation structures 1562 may expand at approximately the same rate with silicon substrate 1512, BOX layer 1522, and cladding layer 1532 to reduce the internal stress and potential damages or defects in the PIC.

Figure 15C:
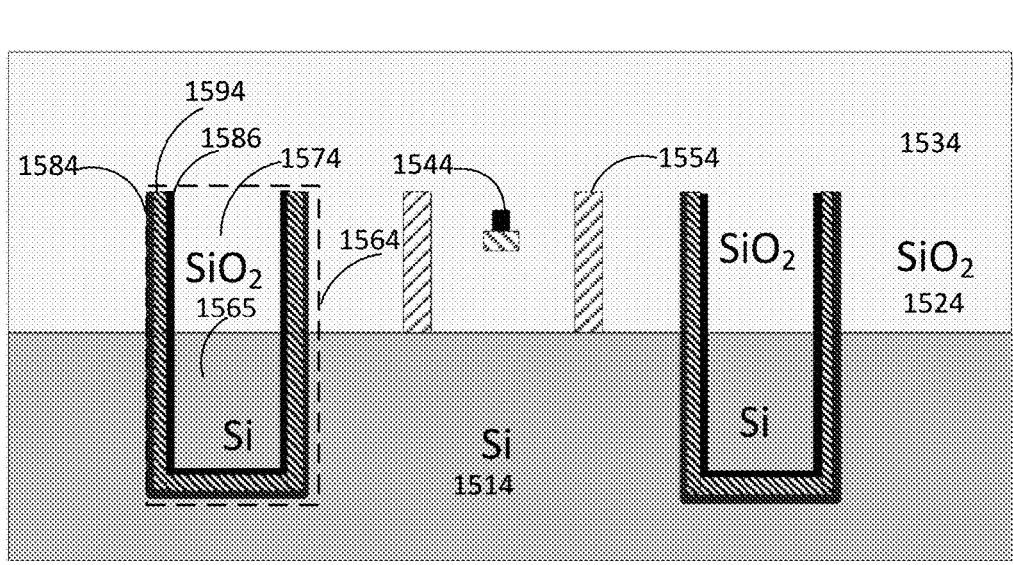
FIG. 15C is a cross-sectional view of an example of a photonic integrated circuit including trenches filled with a thin layer of an optical isolation material and CTE matching materials according to certain embodiments.

FIG. 15C is a cross-sectional view of an example of a photonic integrated circuit 1504 including trenches filled with a thin layer of optical isolation material and CTE matching materials according to certain embodiments. As photonic integrated circuit 1502, photonic integrated circuit 1504 may include a silicon substrate 1514, a BOX layer 1524, and a cladding layer 1534 (e.g., a silicon oxide layer). A superconducting nanowire single-photon detector 1544 may be formed in BOX layer 1524 and cladding layer 1534. To isolate SNSPD 1544, metal plugs 1554 (similar to, e.g., metal plugs 810) may be formed in BOX layer 1524 and cladding layer 1534 adjacent to SNSPD 1544. Metal plugs 1554 may include, for example, vias or trenches filled with tungsten or other metals, metal alloys, or metal compounds. Additional light isolation structures 1564 may be formed in silicon substrate 1514, BOX layer 1524, and cladding layer 1534 to prevent stray light or ambient light from reaching SNSPD 1544 in various directions and through various material layers, such as silicon substrate 1514.

Each light isolation structure 1564 may include a first adhesion layer 1584 (e.g., a Ti layer with a thickness about 2 nm to about 10 nm), an optical isolation layer 1594 (e.g., a TiN, TaN, ZrN, or WN layer with a thickness about 25 nm to about 60 nm), and a second adhesion layer 1586 on each sidewall and the bottom surface of the trench forming light isolation structure 1564. The overall thickness of the two optical isolation layers 1592 in the two opposing sidewalls in light isolation structure 1562 may be, for example, about 50 nm to about 120 nm. Thus, the two optical isolation layers 1594, individually or in combination, may be optically opaque. First adhesion layer 1584 may help to improve the adhesion between optical isolation layer 1594 and silicon substrate 1514 or the oxide layer (e.g., BOX layer 1524 and cladding layer 1534). A portion 1565 of light isolation structure 1564 within silicon substrate 1514 may be filled with polysilicon, and a portion 1574 of light isolation structure 1564 within BOX layer 1524 and cladding layer 1534 may be filled with silicon oxide. Second adhesion layer 1586 may help to improve the adhesion between optical isolation layer 1594 and polysilicon (in portion 1565) and silicon dioxide (in portion 1574) in the trenches. Thus, the portion of light isolation structure 1564 within silicon substrate 1514 (including adhesion layer 1586, optical isolation layer 1594, and portion 1565) may have a CTE approximately matching the CTE of silicon, while the portion of light isolation structures 1564 within BOX layer 1524 and cladding layer 1534 (including adhesion layer 1586, optical isolation layer 1594, and portion 1574) may have a CTE approximately matching the CTE of silicon oxide. Therefore, light isolation structures 1564 may expand at approximately the same rate with silicon substrate 1514, BOX layer 1524, and cladding layer 1534 to reduce the internal stress and potential damages or defects in the PIC.

Figure 16A:
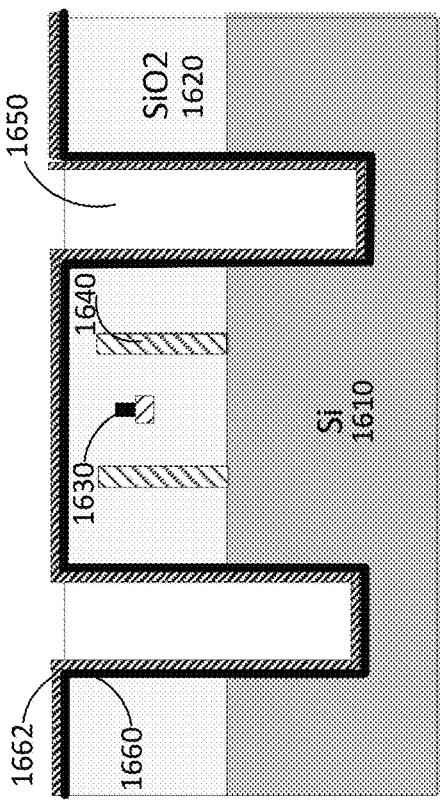
FIGS. 16A-16G illustrate an example of a method of fabricating light isolation structures including a thin optical isolation layer and CTE matching materials according to certain embodiments.

FIGS. 16A-16G illustrate an example of a method of fabricating light isolation structures (e.g., light isolation structures 1562) including a thin optical isolation layer and CTE matching materials according to certain embodiments. FIG. 16A shows trenches 1650 formed in a photonic integrated circuit. The photonic integrated circuit includes a silicon oxide layer 1620 on a silicon substrate 1610, where a superconducting nanowire single-photon detector 1630 and metal plugs 1640 are manufactured in silicon oxide layer 1620. Trenches 1650 may be formed using various selective etching techniques, such as photolithography and dry etching techniques. Trenches 1650 may be etched from the side of silicon oxide layer 1620 or from the side of silicon substrate 1610. In some embodiments, trenches 1650 may be etched through both silicon oxide layer 1620 and silicon substrate 1610.

Figure 16B:
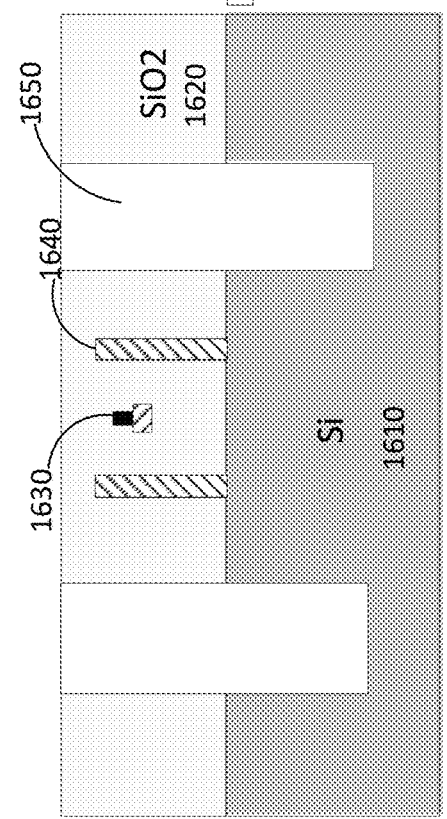

FIG. 16B illustrates the photonic integrated circuit with a thin adhesion layer 1660 and a thin optical isolation layer 1662 conformally deposited on the exposed surfaces of trenches 1650 and the top surface of silicon oxide layer 1620. As described above, adhesion layer 1660 may help to improve the adhesion of optical isolation layer 1662 to the sidewalls and the bottom surface of trenches 1650. Adhesion layer 1660 may include, for example, a Ti layer with a thickness of a few nanometers, such as about 2 nm to about 10 nm. Adhesion layer 1660 may be deposited on the exposed surfaces of trenches 1650 and the top surface of silicon oxide layer 1620 using, for example, atomic layer deposition (ALD), chemical vapor deposition (CVD), physical vapor deposition (PVD), or the like. Optical isolation layer 1662 may include, for example, a metal nitride, such as TiN, TaN, ZrN, WN, or any combination, and may have a thickness of about a few tens of nanometers, such as from about 25 nm to about 60 nm. Optical isolation layer 1662 may be deposited on adhesion layer 1660 using, for example, ALD, CVD, PVD, or the like.

Figure 16C:
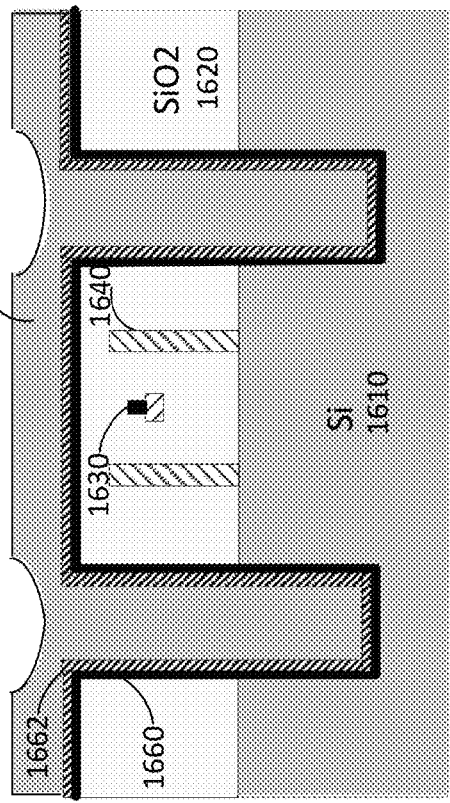
Figure 16D:
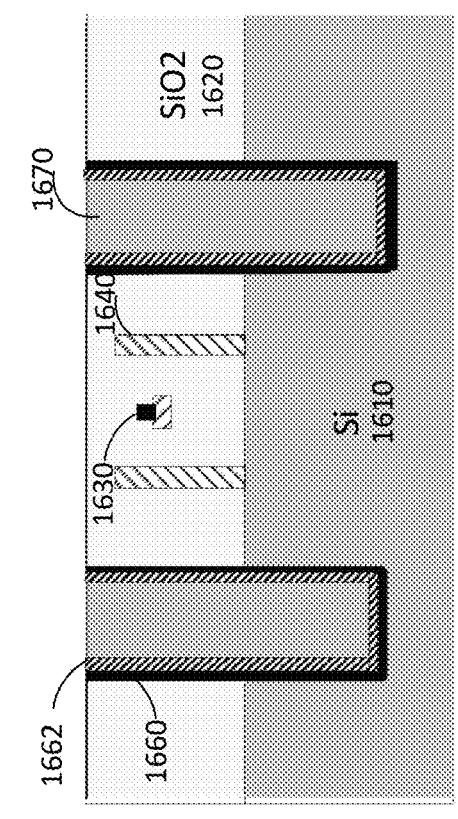

FIG. 16C illustrates that a polysilicon layer 1670 is deposited on the photonic integrated circuit and fills trenches 1650. Polysilicon layer 1670 may be deposited on the photonic integrated circuit by, for example, CVD or PVD. FIG. 16D shows that polysilicon layer 1670 has been planarized by, for example, chemical mechanical polishing (CMP), to expose optical isolation layer 1662, which may then be removed together with adhesion layer 1660 by, for example, selective wet etching.

Figure 16E:
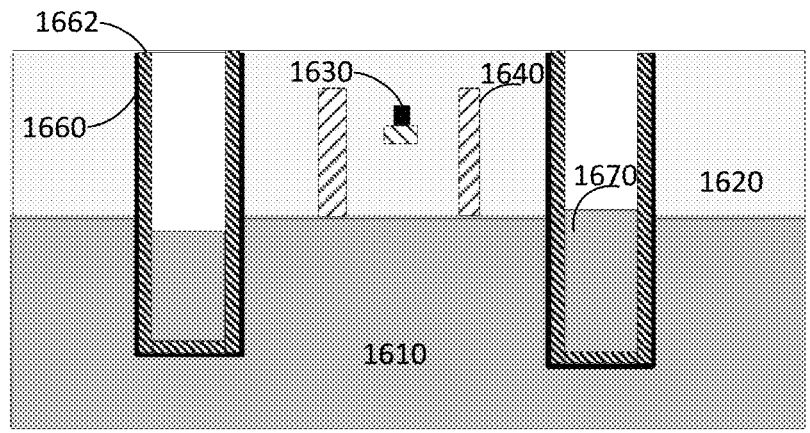

FIG. 16E illustrates that a portion of polysilicon layer 1670 filling trenches 1650 may be selectively etched by a wet etching process to a level approximately aligned with the interface between silicon substrate 1610 and silicon oxide layer 1620. Thus, a portion of polysilicon layer 1670 may remain in trenches 1650, where the top surface of the remaining portion of polysilicon layer 1670 may be approximately aligned with the interface between silicon substrate 1610 and silicon oxide layer 1620.

Figure 16F:
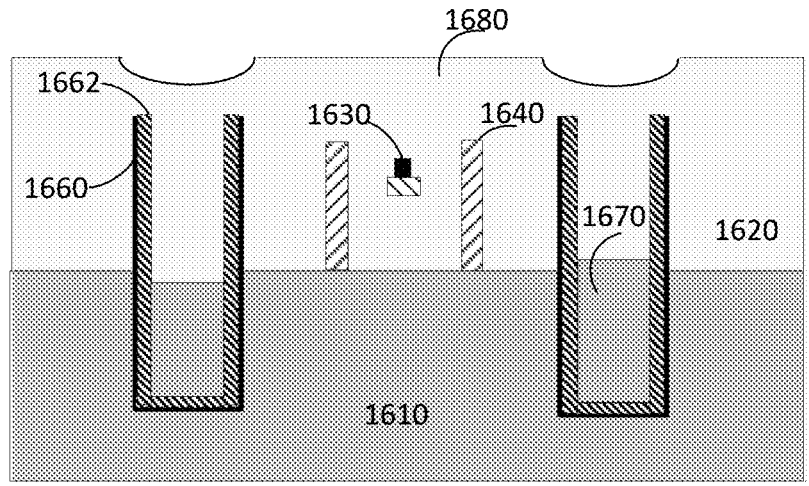

FIG. 16F shows a silicon oxide layer 1680 deposited on silicon oxide layer 1620. Silicon oxide layer 1680 may fill trenches 1650 again. Silicon oxide layer 1680 may be deposited on the photonic integrated circuit by, for example, CVD or PVD.

Figure 16G:
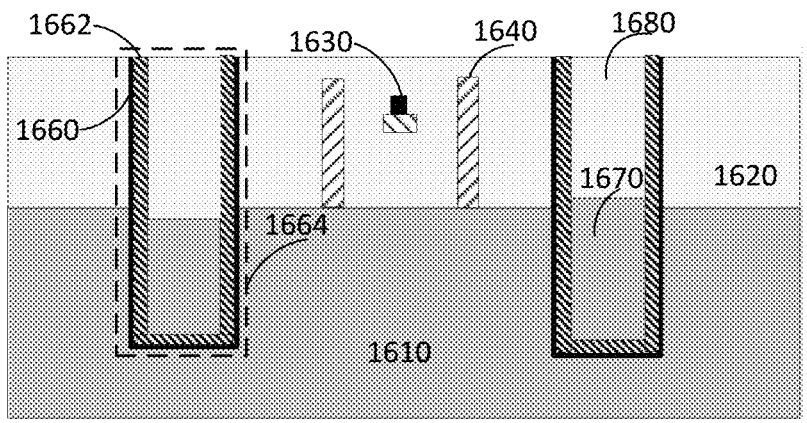

FIG. 16G shows that silicon oxide layer 1680 has been planarized by, for example, chemical mechanical polishing. Thus, the photonic integrated circuit may include light isolation structures 1664 that are similar to light isolation structures 1562 and each include a portion of polysilicon layer 1670 and a portion of silicon oxide layer 1680 surrounded by sidewalls including adhesion layer 1660 and optical isolation layer 1662.

Figure 17B:
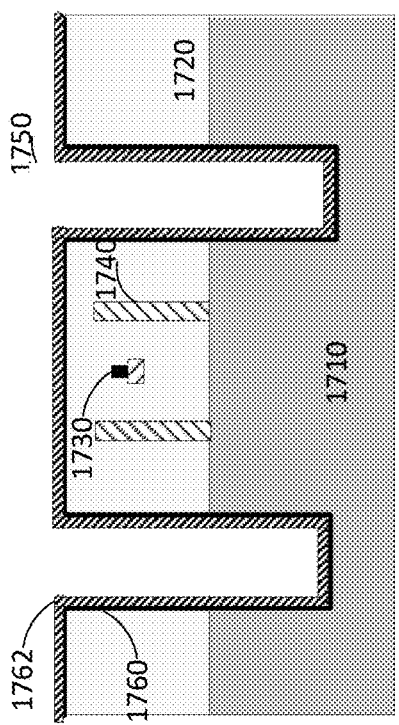
FIGS. 17A-17H illustrate an example of a method of fabricating light isolation structures including a thin optical isolation layer and CTE matching materials according to certain embodiments.
Figure 17C:
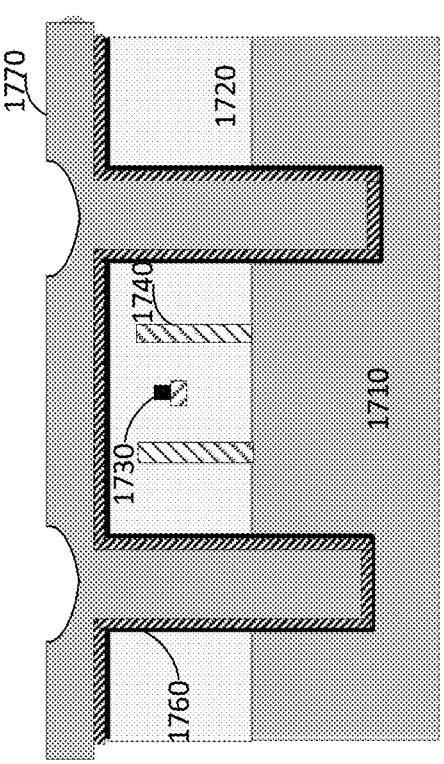
Figure 17A:
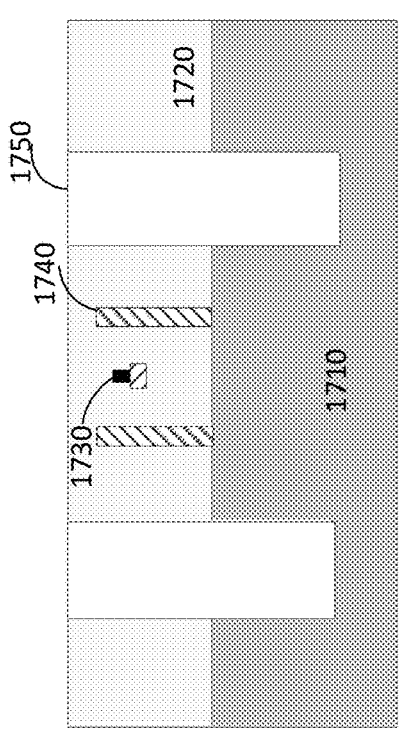

FIGS. 17A-17H illustrate an example of a method of fabricating light isolation structures including a thin optical isolation layer and CTE matching materials according to certain embodiments. FIG. 17A shows trenches 1750 formed in a photonic integrated circuit. The photonic integrated circuit includes a silicon oxide layer 1720 on a silicon substrate 1710, where a superconducting nanowire single-photon detector 1730 and metal plugs 1740 are manufactured in silicon oxide layer 1720. Trenches 1750 may be formed using various selective etching techniques, such as photolithography and dry or wet etching techniques. Trenches 1750 may be etched from the side of silicon oxide layer 1720 or from the side of silicon substrate 1710. In some embodiments, trenches 1750 may be etched through both silicon oxide layer 1720 and silicon substrate 1710.

FIG. 17B illustrates the photonic integrated circuit with a thin adhesion layer 1760 and a thin optical isolation layer 1762 conformally deposited on the exposed surfaces of trenches 1750 and the top surface of silicon oxide layer 1720. As described above, adhesion layer 1760 may help to improve the adhesion of optical isolation layer 1762 to the sidewalls and bottom surface of trenches 1750. Adhesion layer 1760 may include, for example, a Ti layer with a thickness of a few nanometers, such as about 2 nm to about 10 nm. Adhesion layer 1760 may be deposited on the exposed surfaces of trenches 1750 and the top surface of silicon oxide layer 1720 using, for example, ALD, CVD, PVD, or the like. Optical isolation layer 1762 may include, for example, a metal nitride, such as TiN, TaN, ZrN, WN, or any combination, and may have a thickness of about a few tens of nanometers, such as from about 25 nm to about 60 nm. Optical isolation layer 1762 may be deposited on adhesion layer 1760 using, for example, ALD, CVD, PVD, or the like.

Figure 17D:
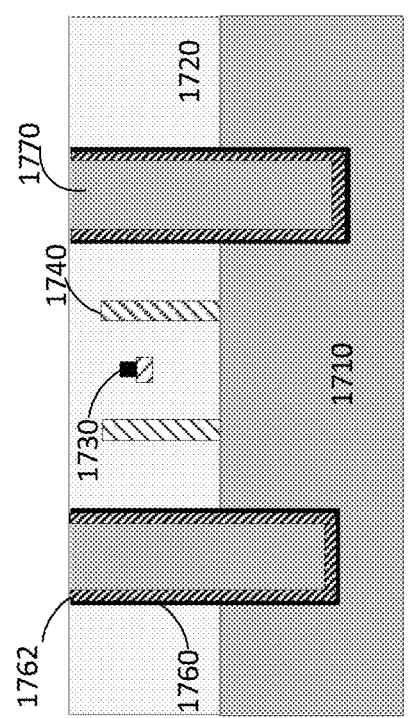

FIG. 17C illustrates that a polysilicon layer 1770 is deposited on the photonic integrated circuit and fills trenches 1750. Polysilicon layer 1770 may be deposited on the photonic integrated circuit by, for example, CVD or PVD. FIG. 17D shows that polysilicon layer 1770 has been planarized by, for example, chemical mechanical polishing, to expose optical isolation layer 1762, which may then be removed together with adhesion layer 1760 by, for example, selective wet etching.

Figure 17F:
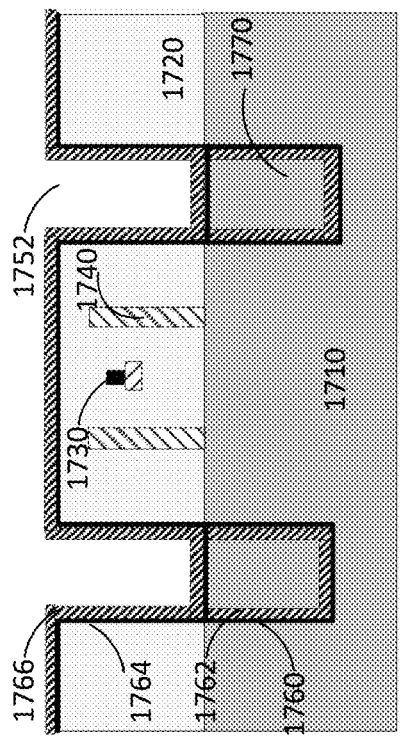
Figure 17G:
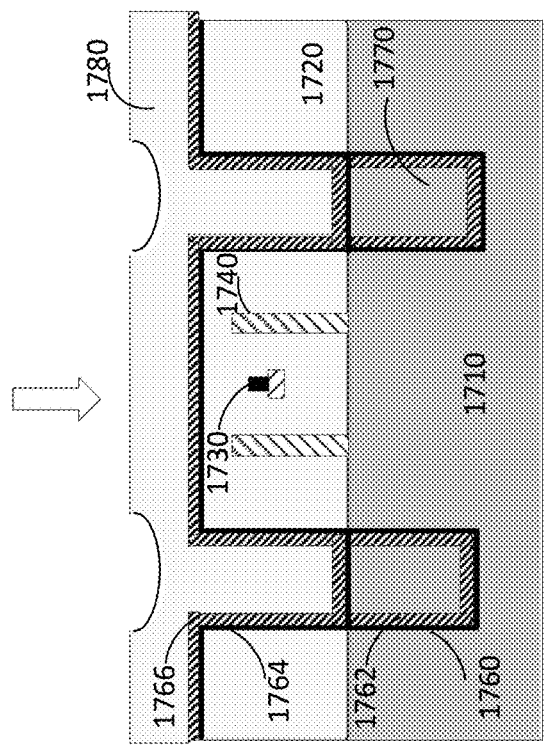
Figure 17E:
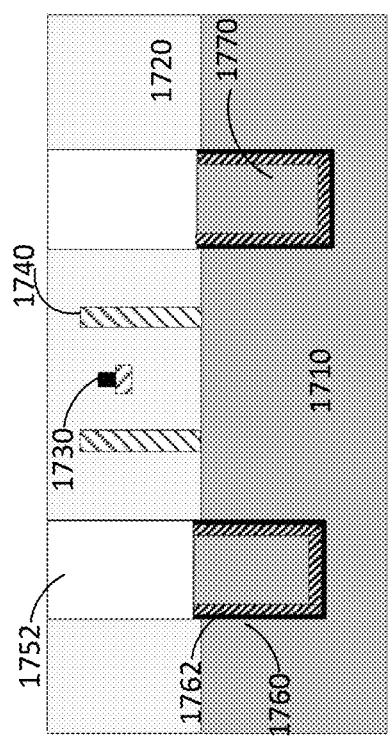

FIG. 17E illustrates that a portion of polysilicon layer 1770 filling trenches 1750 may be selectively etched by a dry etching process, such as plasma etching (e.g., RIE), to a level more precisely aligned with the interface between silicon substrate 1710 and silicon oxide layer 1720. Thus, trenches 1752 may be formed in silicon oxide layer 1720, and a portion of polysilicon layer 1770 may remain in trenches 1750, where the top surface of the remaining portion of polysilicon layer 1770 may be aligned with the interface between silicon substrate 1710 and silicon oxide layer 1720.

FIG. 17F shows that a thin adhesion layer 1764 and a thin optical isolation layer 1766 may be conformally deposited on the exposed surfaces of trenches 1752 and the top surface of silicon oxide layer 1720. As described above, adhesion layer 1764 may help to improve the adhesion of optical isolation layer 1766 to the sidewalls and bottom surface of trenches 1752. Adhesion layer 1764 may include, for example, a Ti layer with a thickness of a few nanometers, such as about 2 nm to about 10 nm. Adhesion layer 1764 may have a thickness similar to the thickness of adhesion layer 1760. Adhesion layer 1764 may be deposited on the exposed surfaces of trenches 1752 and the top surface of silicon oxide layer 1720 using, ALD, CVD, PVD, or the like. Optical isolation layer 1766 may include a metal nitride, such as TiN, TaN, ZrN, WN, or any combination, and may have a thickness similar to the thickness of optical isolation layer 1762. For example, the thickness of optical isolation layer 1766 may be about a few tens of nanometers, such as from about 25 nm to about 60 nm. Optical isolation layer 1766 may be deposited on adhesion layer 1764 using, for example, ALD, CVD, PVD, or the like.

FIG. 17G shows a silicon oxide layer 1780 deposited on silicon oxide layer 1720. Silicon oxide layer 1780 may fill trenches 1752. Silicon oxide layer 1780 may be deposited on the photonic integrated circuit by, for example, CVD or PVD.

Figure 17H:
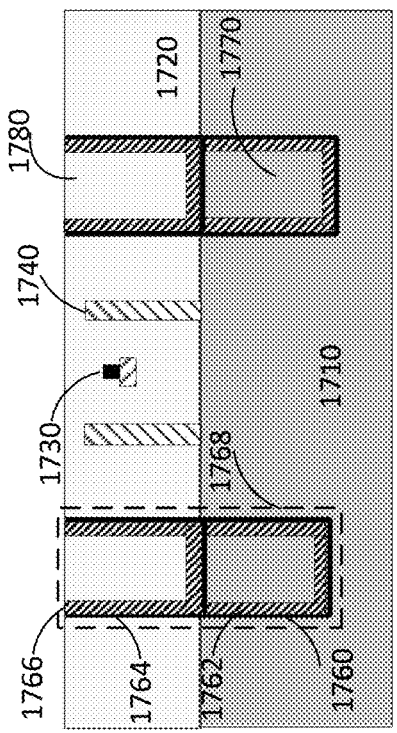

FIG. 17H shows that silicon oxide layer 1780 has been planarized by, for example, chemical mechanical polishing. Adhesion layer 1764 and optical isolation layer 1766 may be removed, for example, by selective dry or wet etching. Thus, the photonic integrated circuit may include light isolation structures 1768 that each include a portion of polysilicon layer 1770 and a portion of silicon oxide layer 1780 surrounded by sidewalls including adhesion layer 1760 or 1764 and optical isolation layer 1762 or 1766.

As described above with respect to FIG. 15C, in order to improve the adhesion between optical isolation layer 1594 and the polysilicon or silicon oxide that fills the deep trenches to form the light isolation structures, a second adhesion layer 1586 may be used between optical isolation layer 1594 and the polysilicon or silicon oxide that fills the deep trenches.

Figure 18B:
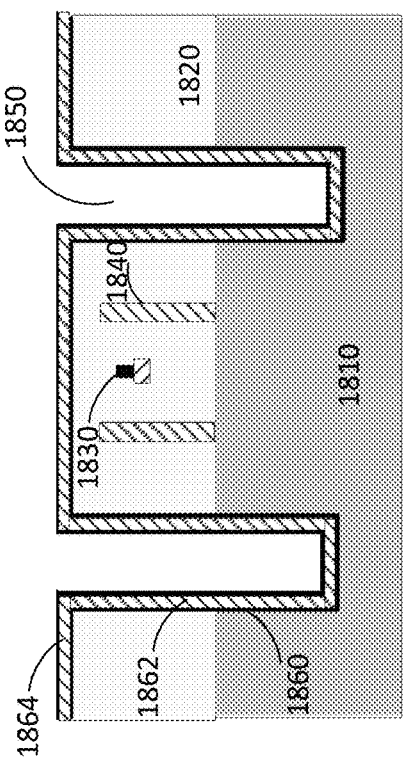
FIGS. 18A-18G illustrate an example of a method of fabricating light isolation structures including a thin optical isolation layer and CTE matching materials according to certain embodiments.
Figure 18C:
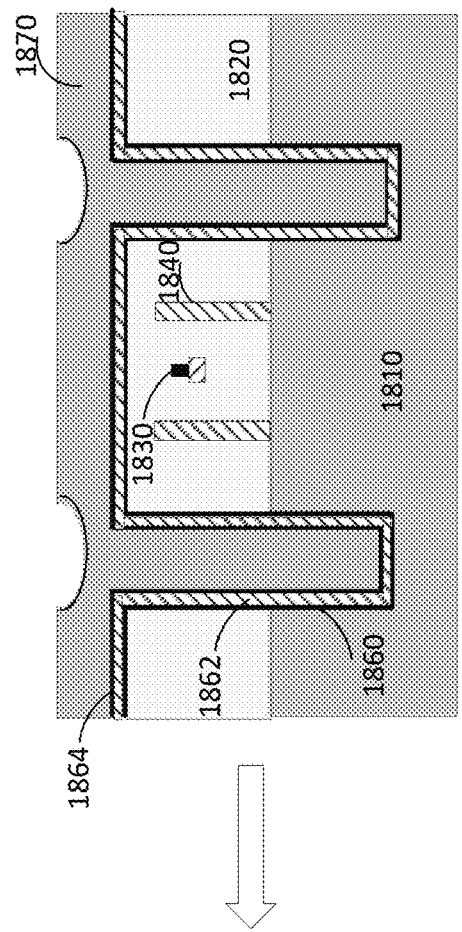
Figure 18A:
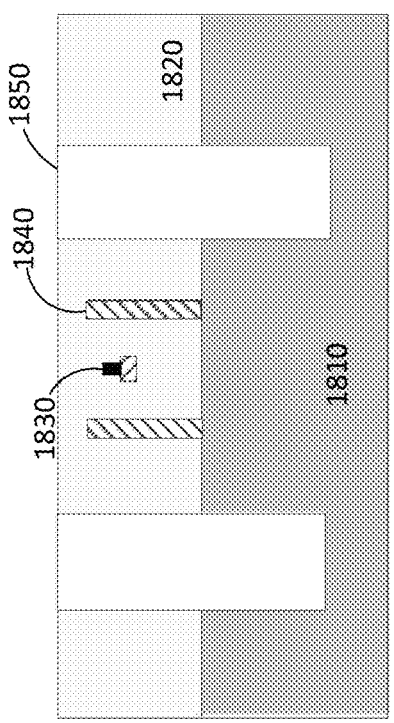

FIGS. 18A-18G illustrate an example of a method of fabricating light isolation structures (e.g., light isolation structures 1564) including a thin optical isolation layer and CTE matching materials according to certain embodiments. FIG. 18A shows trenches 1850 formed in a photonic integrated circuit. The photonic integrated circuit includes a silicon oxide layer 1820 on a silicon substrate 1810, where a superconducting nanowire single-photon detector 1830 and metal plugs 1840 are manufactured in silicon oxide layer 1820. Trenches 1850 may be formed using various etching techniques, such as photolithography and dry or wet etching techniques. Trenches 1850 may be etched from the side of silicon oxide layer 1820 or from the side of silicon substrate 1810. In some embodiments, trenches 1850 may be etched through both silicon oxide layer 1820 and silicon substrate 1810.

FIG. 18B illustrates the photonic integrated circuit with a first adhesion layer 1860, a thin optical isolation layer 1862, and a second adhesion layer 1864 conformally deposited on the exposed surfaces of trenches 1850 and the top surface of silicon oxide layer 1820. As described above, first adhesion layer 1860 may help to improve the adhesion of optical isolation layer 1862 to the sidewalls and the bottom surface of trenches 1850. First adhesion layer 1860 may include, for example, a Ti layer with a thickness of a few nanometers, such as about 2 nm to about 10 nm. First adhesion layer 1860 may be deposited on the exposed surfaces of trenches 1850 and the top surface of silicon oxide layer 1820 using, for example, ALD, CVD, PVD, or the like. Optical isolation layer 1862 may include, for example, a metal nitride, such as TiN, TaN, ZrN, WN, or any combination, and may have a thickness of about a few tens of nanometers, such as from about 25 nm to about 60 nm. Optical isolation layer 1862 may be deposited on first adhesion layer 1860 using, for example, ALD, CVD, PVD, or the like. Second adhesion layer 1864 may help to improve the adhesion of optical isolation layer 1862 to materials in trenches 1850. Second adhesion layer 1864 may include, for example, a Ti layer with a thickness of a few nanometers, such as about 2 nm to about 10 nm. Second adhesion layer 1864 may be deposited on optical isolation layer 1862 using, for example, ALD, CVD, PVD, or the like.

FIG. 18C illustrates that a polysilicon layer 1870 is deposited on the photonic integrated circuit and fills trenches 1850. Polysilicon layer 1870 may be deposited on the photonic integrated circuit by, for example, CVD or PVD.

Figure 18D:
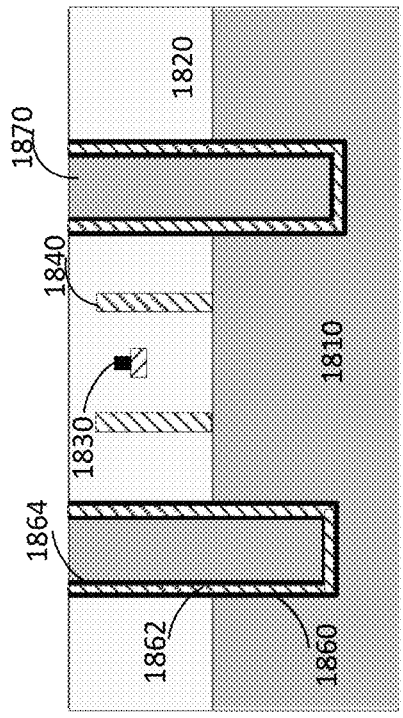

FIG. 18D shows that polysilicon layer 1870 has been planarized by, for example, chemical mechanical polishing, to expose second adhesion layer 1864 or optical isolation layer 1862, which may then be removed together with first adhesion layer 1860 by, for example, selective wet etching.

Figure 18E:
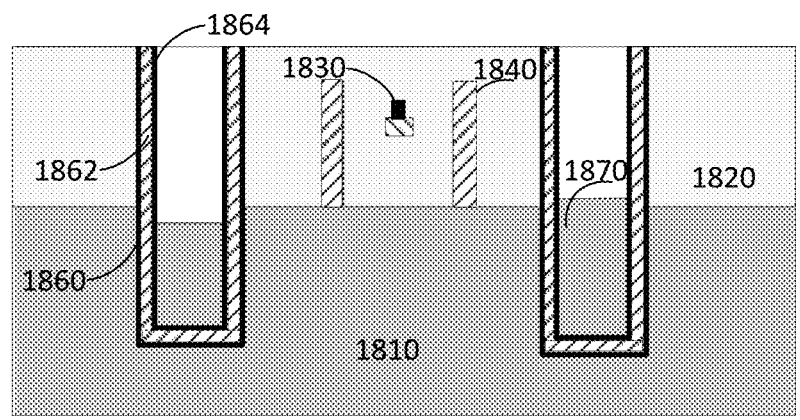

FIG. 18E illustrates that a portion of polysilicon layer 1870 filling trenches 1850 may be selectively etched by, for example, a wet etching process, to a level approximately aligned with the interface between silicon substrate 1810 and silicon oxide layer 1820. Thus, a portion of polysilicon layer 1870 may remain in trenches 1850, where the top surface of the remaining portion of polysilicon layer 1870 may be approximately aligned with the interface between silicon substrate 1810 and silicon oxide layer 1820.

Figure 18F:
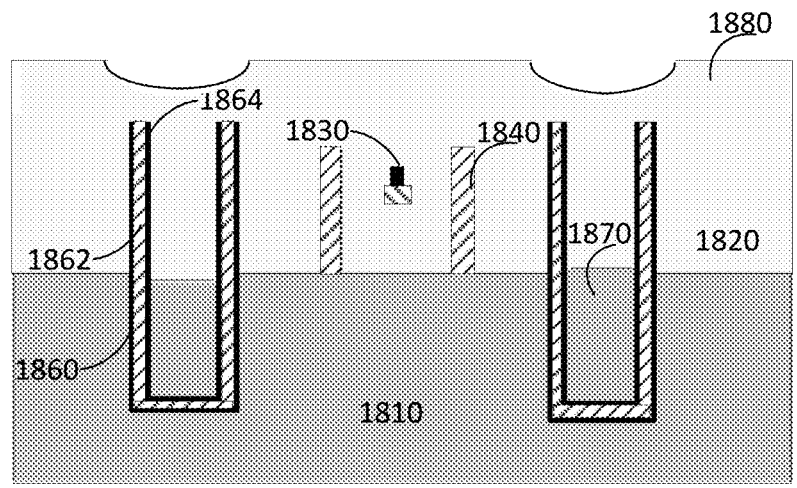

FIG. 18F shows a silicon oxide layer 1880 deposited on silicon oxide layer 1820. Silicon oxide layer 1880 may fill trenches 1850 again. Silicon oxide layer 1880 may be deposited on the photonic integrated circuit by, for example, CVD or PVD.

Figure 18G:
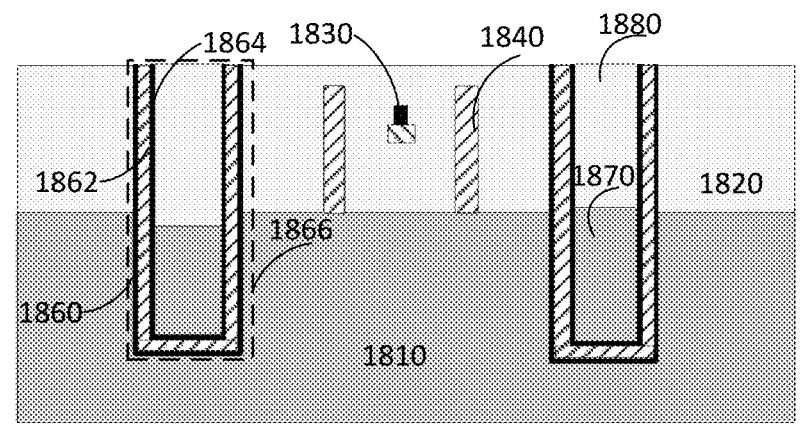

FIG. 18G shows that silicon oxide layer 1880 has been planarized by, for example, chemical mechanical polishing.

Third adhesion layer 1966, optical isolation layer 1968, and fourth adhesion layer 1972 may be removed, for example, by selective dry or wet etching. Thus, the photonic integrated circuit may include light isolation structures 1866 that are similar to light isolation structures 1564 and each include a portion of polysilicon layer 1870 and a portion of silicon oxide layer 1880 surrounded by sidewalls including first adhesion layer 1860, optical isolation layer 1862, and second adhesion layer 1864.

Figure 19B:
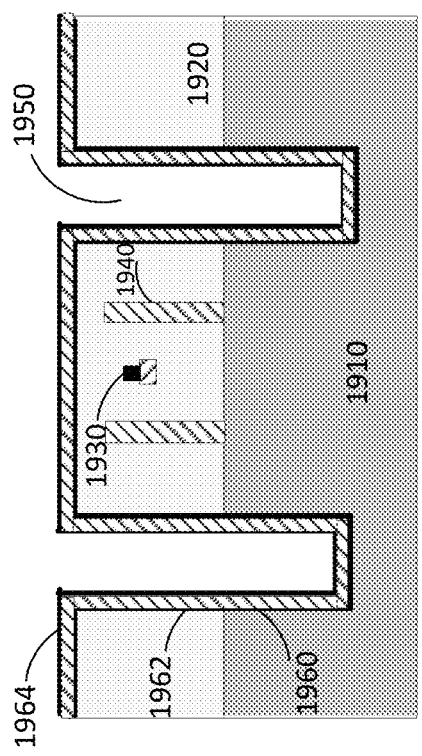
FIGS. 19A-19H illustrate an example of a method of fabricating light isolation structures including a thin optical isolation layer and CTE matching materials according to certain embodiments.
Figure 19C:
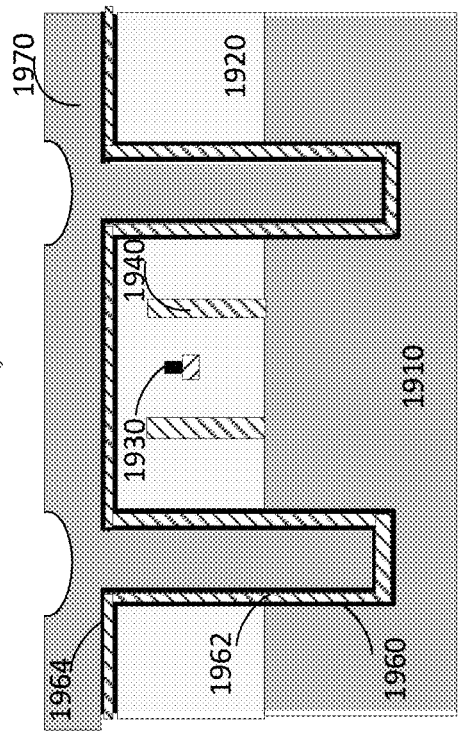
Figure 19A:
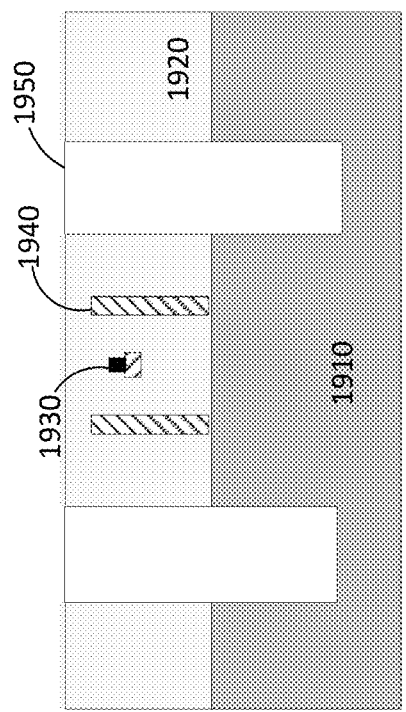

FIGS. 19A-19H illustrate an example of a method of fabricating light isolation structures including a thin optical isolation layer and CTE matching materials according to certain embodiments. FIG. 19A shows trenches 1950 formed in a photonic integrated circuit. The photonic integrated circuit includes a silicon oxide layer 1920 on a silicon substrate 1910, where a superconducting nanowire single-photon detector 1930 and metal plugs 1940 are formed in silicon oxide layer 1920. Trenches 1950 may be formed using various etching techniques, such as photolithography and selective dry or wet etching techniques. Trenches 1950 may be etched from the side of silicon oxide layer 1920 or from the side of silicon substrate 1910. In some embodiments, trenches 1950 may be etched through both silicon oxide layer 1920 and silicon substrate 1910.

FIG. 19B illustrates the photonic integrated circuit with a first adhesion layer 1960, a thin optical isolation layer 1962, and a second adhesion layer 1964 conformally deposited on the exposed surfaces of trenches 1950 and the top surface of silicon oxide layer 1920. As described above, first adhesion layer 1960 may help to improve the adhesion of optical isolation layer 1962 to the sidewalls and the bottom surface of trenches 1950. First adhesion layer 1960 may include, for example, a Ti layer with a thickness of a few nanometers, such as about 2 nm to about 10 nm. First adhesion layer 1960 may be deposited on the exposed surfaces of trenches 1950 and the top surface of silicon oxide layer 1920 using, for example, ALD, CVD, PVD, or the like. Optical isolation layer 1962 may include, for example, a metal nitride, such as TiN, TaN, ZrN, WN, or any combination, and may have a thickness of about a few tens of nanometers, such as from about 25 nm to about 60 nm. Optical isolation layer 1962 may be deposited on first adhesion layer 1960 using, for example, ALD, CVD, PVD, or the like. Second adhesion layer 1964 may help to improve the adhesion of optical isolation layer 1962 to materials in trenches 1950. Second adhesion layer 1964 may include, for example, a Ti layer with a thickness of a few nanometers, such as about 2 nm to about 10 nm. Second adhesion layer 1964 may be deposited on optical isolation layer 1962 using, for example, ALD, CVD, PVD, or the like.

FIG. 19C illustrates that a polysilicon layer 1970 is deposited on the photonic integrated circuit and fills trenches 1950. Polysilicon layer 1970 may be deposited on the photonic integrated circuit by, for example, CVD or PVD.

Figure 19D:
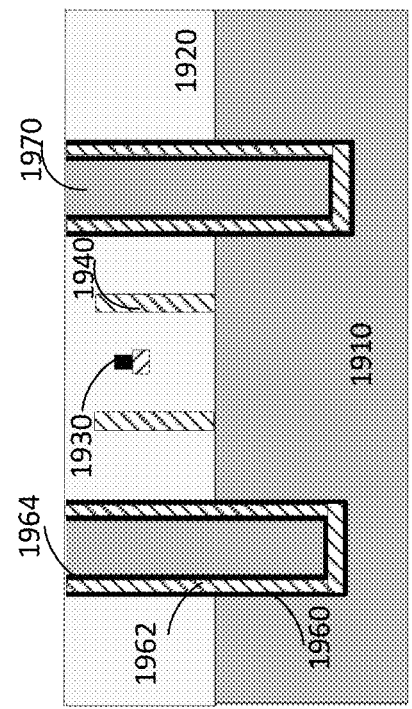

FIG. 19D shows that polysilicon layer 1970 has been planarized by, for example, chemical mechanical polishing, to expose second adhesion layer 1964 or optical isolation layer 1962, which may then be removed together with first adhesion layer 1960 by, for example, selective wet etching.

Figure 19F:
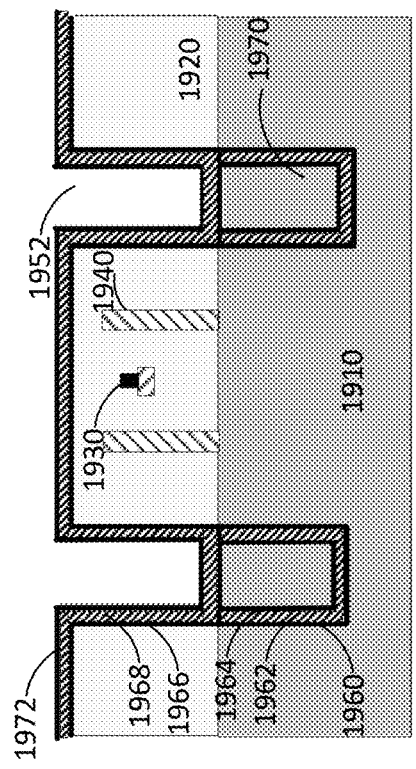
Figure 19G:
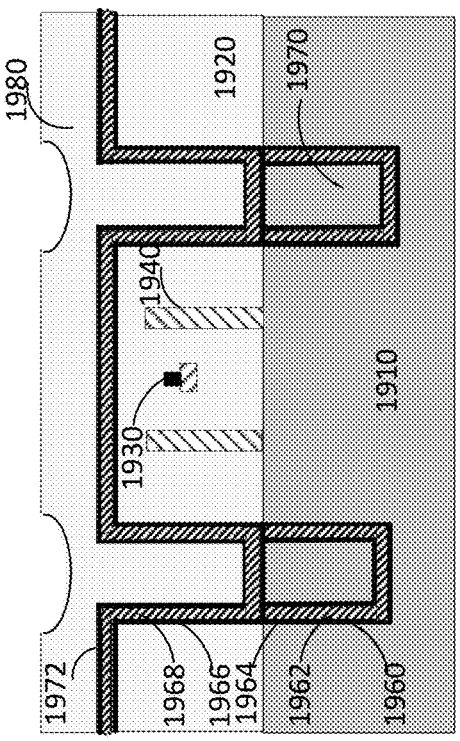
Figure 19E:
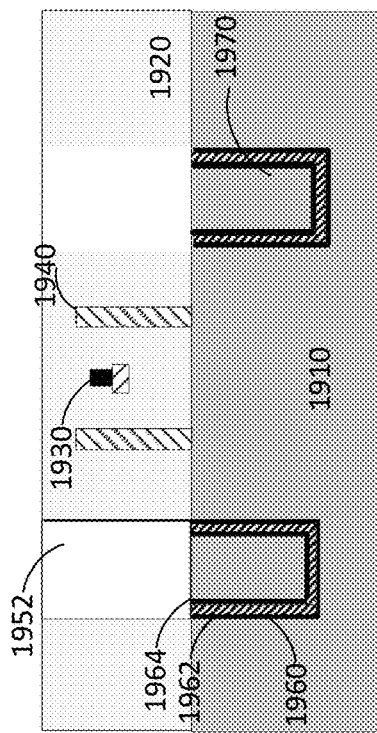

FIG. 19E illustrates that a portion of polysilicon layer 1970 filling trenches 1950 may be selectively etched by a dry etching process, such as plasma etching (e.g., RIE), to a level more precisely aligned with the interface between silicon substrate 1910 and silicon oxide layer 1920. Thus, trenches 1952 may be formed in silicon oxide layer 1920, and a portion of polysilicon layer 1970 may remain in trenches 1950, where the top surface of the remaining portion of polysilicon layer 1970 may be aligned with the interface between silicon substrate 1910 and silicon oxide layer 1920.

FIG. 19F shows that a third adhesion layer 1966, a thin optical isolation layer 1968, and a fourth adhesion layer 1972 may be conformally deposited on the exposed surfaces of trenches 1952 and the top surface of silicon oxide layer 1920. As described above, third adhesion layer 1966 may help to improve the adhesion of optical isolation layer 1968 to the sidewalls and bottom surface of trenches 1952. Third adhesion layer 1966 may have a thickness similar to the thickness of first adhesion layer 1960. For example, third adhesion layer 1966 may include a Ti layer with a thickness of a few nanometers, such as about 2 nm to about 10 nm. Third adhesion layer 1966 may be deposited on the exposed surfaces of trenches 1952 and the top surface of silicon oxide layer 1920 using, for example, ALD, CVD, PVD, or the like. Optical isolation layer 1968 may include, for example, a metal nitride, such as TiN, TaN, ZrN, WN, or any combination, and may have a thickness similar to the thickness of optical isolation layer 1962. For example, the thickness of optical isolation layer 1968 may be about a few tens of nanometers, such as from about 25 nm to about 60 nm. Optical isolation layer 1968 may be deposited on third adhesion layer 1966 using, for example, ALD, CVD, PVD, or the like. Fourth adhesion layer 1972 may help to improve the adhesion of optical isolation layer 1968 to materials in trenches 1952. Fourth adhesion layer 1972 may include, for example, a Ti layer with a thickness of a few nanometers, such as about 2 nm to about 10 nm. Fourth adhesion layer 1972 may be deposited on optical isolation layer 1968 using, for example, ALD, CVD, PVD, or the like.

FIG. 19G shows a silicon oxide layer 1980 deposited on silicon oxide layer 1920. Silicon oxide layer 1980 may fill trenches 1952. Silicon oxide layer 1980 may be deposited on the photonic integrated circuit by, for example, CVD or PVD.

Figure 19H:
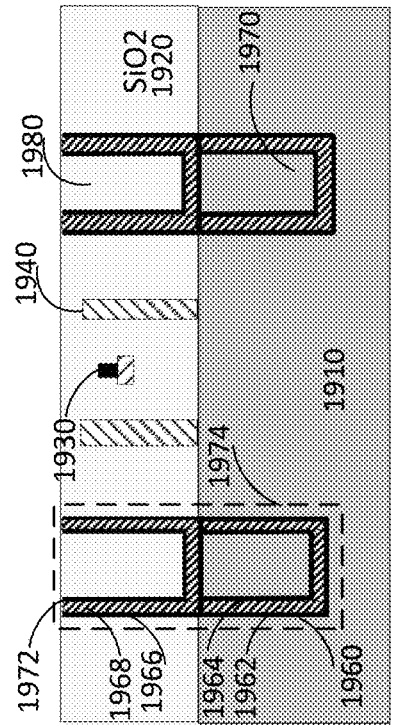

FIG. 19H shows that silicon oxide layer 1980 has been planarized by, for example, chemical mechanical polishing. Third adhesion layer 1966, optical isolation layer 1968, and fourth adhesion layer 1972 may be removed, for example, by selective dry or wet etching. Thus, the photonic integrated circuit may include light isolation structures 1974 that each include a portion of polysilicon layer 1970 and a portion of silicon oxide layer 1980 surrounded by sidewalls including adhesion layers 1960 and 1964 or adhesion layers 1966 and 1972, and optical isolation layer 1962 or 1966.

Techniques described above can also be used to form other light isolation structures for light isolation in photonic integrated circuits. For example, trenches 710 shown in FIG. 7 and/or trenches 1110 shown in FIG. 11 described above may be filled with a thin optical isolation layer and CTE-matching materials, where trenches 1110 in silicon substrate 610 and trenches 710 in BOX layer 620 and oxide layer 630 may not be aligned and may be formed (e.g., etched) and filled separately. For example, trenches 710 in BOX layer 620 or oxide layer 630 may be filled from the top of oxide layer 630, while trenches 1110 in silicon substrate 610 may be filled from the bottom surface of silicon substrate 610.

Figure 20:
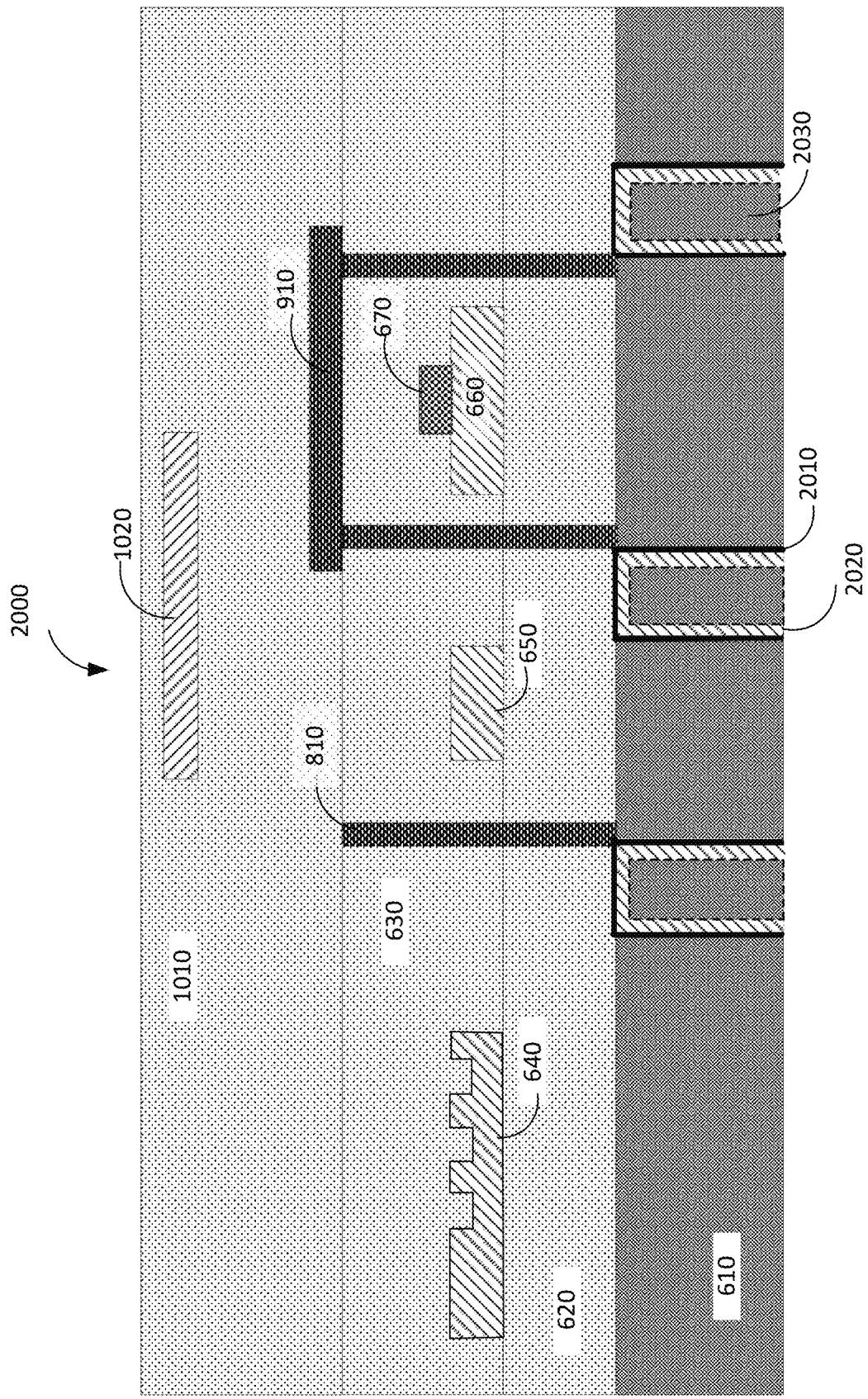
FIG. 20 is a cross-sectional view of an example of a photonic integrated circuit including deep trenches in a substrate filled with a thin optical isolation layer and CTE matching materials according to certain embodiments.

FIG. 20 is a cross-sectional view of an example of a photonic integrated circuit 2000 including deep trenches in a substrate filled with a thin optical isolation layer and CTE matching materials according to certain embodiments. Photonic integrated circuit 2000 may be made from photonic integrated circuit 1100. For example, a thin adhesion layer 2010 may be deposited on the exposed surfaces of silicon substrate 610 (including the internal surfaces of trenches 1110 and the bottom surface of silicon substrate 610), and a thin optical isolation layer 2020 may be deposited on thin adhesion layer 2010. Adhesion layer 2010 may be similar to, for example, adhesion layer 1660, 1760, 1860, or 1960, and may include, for example, a Ti layer with a thickness of a few nanometers, such as about 2 nm to about 10 nm. Optical isolation layer 2020 may be similar to, for example, optical isolation layer 1662, 1762, 1862, or 1962, and may include, for example, a metal nitride, such as TiN, TaN, ZrN, WN, or any combination, and may have a thickness of about a few tens of nanometers, such as from about 25 nm to about 60 nm. Adhesion layer 2010 and optical isolation layer 2020 may be deposited by, for example, ALD, CVD, PVD, or the like. In some embodiments, another adhesion layer (similar to, e.g., adhesion layer 1864 or 1964, not shown in FIG. 20) may be deposited on optical isolation layer 2020. In some embodiments, a polysilicon layer 2030 may be deposited on silicon substrate 610 and may fill trenches 1110. Polysilicon layer 2030 may be planarized by CMP to expose optical isolation layer 2020 or adhesion layer 2010, which can be removed by, for example, selective dry or wet etching.

In some embodiments, the trenches described above may not be filled with a CTE matching material, and thus the light isolation structure may include an air gap surrounded by the thin optical isolation layer and/or the adhesion layer. The air gap may allow the surrounding materials to expand or contract without being constrained and thus may help to reduce thermally induced stress.

Figure 21:
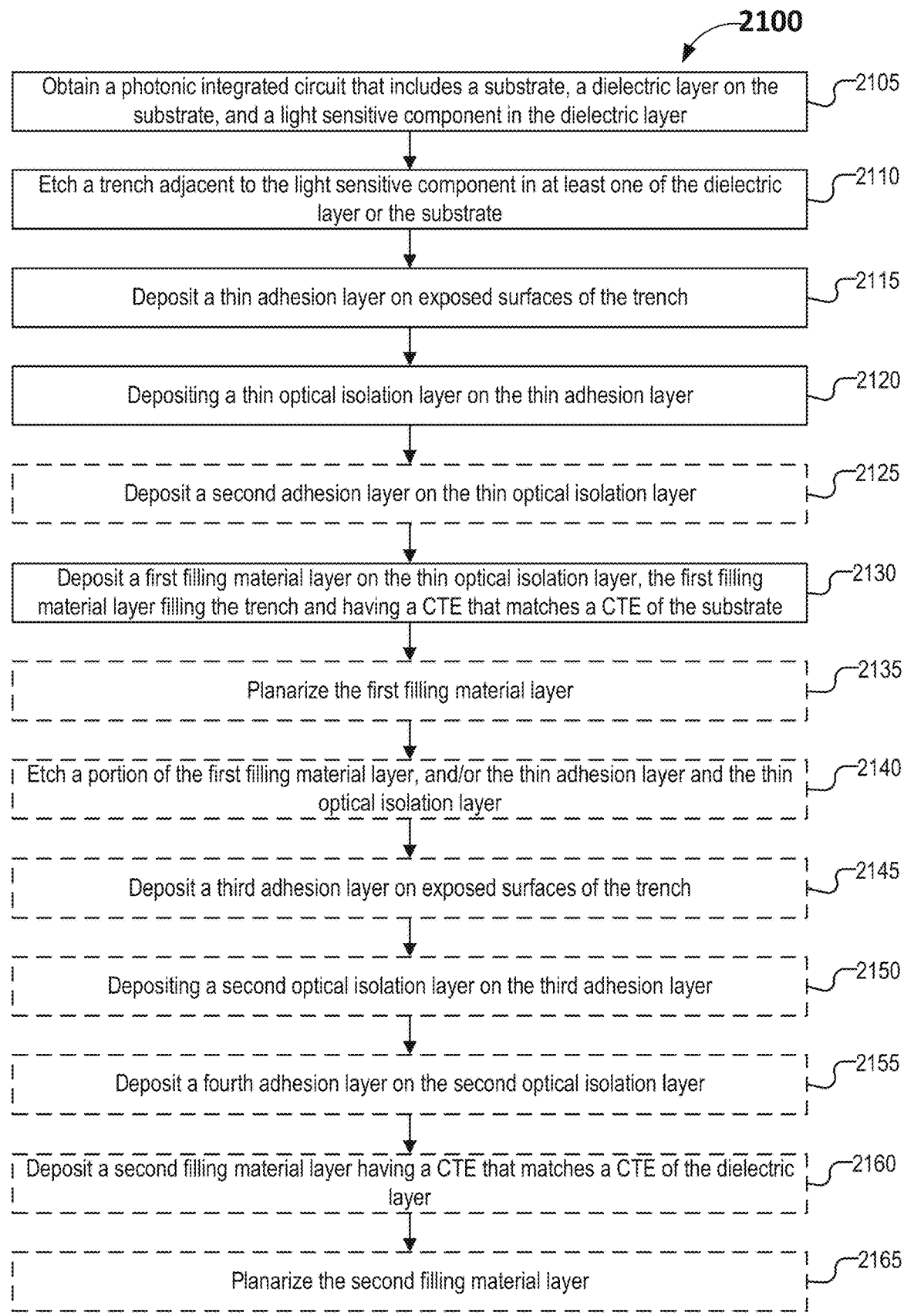
FIG. 21 is a flow chart illustrating an example method of fabricating light isolation structures in a photonic integrated circuit according to certain embodiments.

FIG. 21 is a flow chart 2100 illustrating an example method of fabricating light isolation structures in a photonic integrated circuit according to certain embodiments. Even though FIG. 21 describes the operations in a sequential flow, some of the operations may be performed in parallel or concurrently. Some operations may be performed in a different order. An operation may have additional steps not included in the figure. Some operations may be optional, and thus may be omitted in various embodiments. Some operations may be performed together with another operation At block 2105, a photonic integrated circuit that includes a substrate, a dielectric layer on the substrate, and a light sensitive component in the dielectric layer may be obtained. The light sensitive component may include a single-photon detector, such as a superconducting nanowire single-photon detector. The photonic integrated circuit may also include a waveguide connected to the light sensitive component, and an input coupler or input port for the waveguide, such as a grating coupler.

At block 2110, a trench may be etched in at least one of the dielectric layer or the substrate at a region adjacent to the light sensitive component or the input port (or input coupler) for the waveguide. The trench may be drilled, dry etched, or wet etched. The trench may be in the substrate, the dielectric layer, or both.

At block 2115, a thin adhesion layer may be deposited on the exposed surfaces of the trench, including the sidewalls and the bottom of the trench. The thin adhesion layer may have a thickness less than 20 nm, such as between about 2 nm and about 10 nm. The first adhesion layer may include, for example, a titanium layer. The thin adhesion layer may be deposited on the exposed surfaces of the trench by, for example, ALD, CVD, PVD, or the like, as described above. The thin adhesion layer may help to improve the adhesion between an optical isolation material and the substrate or the dielectric layer.

At block 2120, a thin optical isolation layer may be deposited on the thin adhesion layer by, for example, ALD, CVD, PVD, or the like, as described above. The optical isolation layer may have a thickness greater than a value such that the two opposing sidewalls in combination are optically opaque. The thickness may be less than 60 nm, such as between about 25 nm and about 60 nm. The optical isolation layer may include, for example, a metal nitride, such as TiN, TaN, ZrN, WN, or the like. The overall thickness of two optical isolation layers on two opposing sidewalls of the trench may be, for example, about 50 nm to about 120 nm. Thus, the two optical isolation layers, individually or in combination, may be optically opaque.

Optionally, at block 2125, a second adhesion layer may be deposited on the thin optical isolation layer. The second adhesion layer may have a thickness less than 20 nm, such as between about 2 nm and about 10 nm. As the thin adhesion layer, the second adhesion layer may include, for example, a titanium layer. The second adhesion layer may be deposited on the thin optical isolation layer by, for example, ALD, CVD, PVD, or the like, as described above. The second adhesion layer may help to improve the adhesion between the optical isolation material and filling materials.

At block 2130, a first filling material layer may be deposited on the thin optical isolation layer. The first filling material layer may have a CTE that matches a CTE of the substrate or the dielectric layer. The first filling material layer may include, for example, polysilicon. The first filling material layer may be deposited by, for example, CVD or PVD.

Optionally, at block 2135, the first filling material layer may be planarized, for example, using CMP, which may expose the thin optical isolation layer and/or the second adhesion layer. The exposed thin optical isolation layer and/or the adhesion layer(s) on the dielectric layer may be removed by, for example, selective wet etching.

Optionally, at block 2140, a portion of the first filling material layer may be etched using wet etch or dry etch techniques as described above. The wet etch may remove the portion of the first filling material in the trench until the top surface of the remaining first filling material is approximately aligned with the interface between the substrate and the dielectric layer. The dry etch, such as plasma etching (e.g., RIE), may more precisely etch the first filling material such that the top surface of the remaining first filling material may be more precisely aligned with the interface between the substrate and the dielectric layer. The dry etch may etch the adhesion layer(s) and the thin optical isolation layer as well.

Optionally, at block 2145, a third adhesion layer may be deposited on exposed surfaces of the trench. The third adhesion layer may help to improve the adhesion between an optical isolation material and the dielectric layer. The third adhesion layer may be similar to the thin adhesion layer described above, and may be deposited using techniques similar to techniques used for depositing the thin adhesion layer described above.

Optionally, at block 2150, a second optical isolation layer may be deposited on the third adhesion layer. The second optical isolation layer may be similar to the thin second optical isolation layer, and may be deposited using techniques similar to techniques used for depositing the thin optical isolation layer described above.

Optionally, at block 2155, a fourth adhesion layer may be deposited on the second optical isolation layer. The fourth adhesion layer may help to improve the adhesion between the second optical isolation material and the filling materials. The fourth adhesion layer may be similar to the second adhesion layer described above, and may be deposited using techniques similar to the techniques used for depositing the second adhesion layer described above.

Optionally, at block 2160, a second filling material layer having a CTE that matches a CTE of the dielectric layer may be deposited on the second optical isolation layer or the fourth adhesion layer. The second filling material layer may include, for example, silicon dioxide. The second filling material layer may be deposited by, for example, CVD or PVD.

Optionally, at block 2165, the second filling material layer may be planarized, for example, using CMP, which may expose the second optical isolation layer and/or the fourth adhesion layer. The exposed second optical isolation layer and/or the adhesion layer(s) on the dielectric layer may be removed by, for example, selective wet etching.

The highly sensitive photodetectors described above may be used to detect individual photons in quantum computing or quantum cryptography. For example, single-photon sources may be used in many photonic quantum technologies. An ideal single-photon source would generate single photons deterministically. One way to achieve a deterministic single-photon source is to use cascaded (or multiplexed) heralded photon sources based on, for example, spontaneous four wave mixing (SFWM) or spontaneous parametric down-conversion (SPDC) in passive nonlinear optical media. In each heralded photon source (HPS), photons may be non-deterministically produced in pairs (which includes a signal photon and an idler photon), where one photon (e.g., signal photon) heralds the existence of the other photon (e.g., idler photon) in the pair. Thus, if a signal photon is detected by a highly sensitive photodetector (e.g., a single-photon detector as described above) at one heralded photon source, the corresponding idler photon can be used as the output of the single-photon source, while other heralded photon sources in the cascaded (or multiplexed) heralded photon sources of the single-photon source can be bypassed or switched off.

It will be apparent to those skilled in the art that substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In some implementations, operations or processing may involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining," or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A device comprising:
   a substrate;
   a dielectric layer on the substrate;
   a waveguide within the dielectric layer;
   a light sensitive component disposed entirely in the dielectric layer and coupled to the waveguide; and
   a plurality of light isolation structures in at least one of the substrate or the dielectric layer and adjacent to the light sensitive components, the plurality of light isolation structures configured to reflect or absorb stray light to prevent the stray light from reaching the light sensitive component.

2. The device of claim 1, wherein the plurality of light isolation structures includes at least one of:
   a metal trench in the dielectric layer;
   an array of metal vias in the dielectric layer;
   a metal cover in the dielectric layer and on top of the light sensitive component; or
   a deep trench in the substrate, the deep trench including an air gap or filled with a light reflection or absorption material.

3. The device of claim 2, wherein the metal cover is in a metal layer and is aligned with or coupled to the metal trench or the array of metal vias to form a contiguous structure surrounding the light sensitive component.

4. The device of claim 2, wherein:
   the waveguide includes an input port; and
   the metal trench or the array of metal vias is located at a region including the input port.

5. The device of claim 1, wherein the light sensitive component includes a single-photon detector.

6. The device of claim 5, wherein the single-photon detector includes a superconducting nanowire single-photon detector.

7. The device of claim 1, wherein a light isolation structure in the plurality of light isolation structures includes:
   two opposing sidewalls each including an optical isolation layer; and
   a filling material between the two opposing sidewalls and characterized by a coefficient of thermal expansion (CTE) matching a CTE of at least one of the substrate or the dielectric layer.

8. The device of claim 7, wherein the optical isolation layer includes a metal nitride.

9. The device of claim 7, wherein:
   the plurality of light isolation structures includes a first light isolation structure in the substrate and a second light isolation structure in the dielectric layer;
   the CTE of the filling material in the first light isolation structure matches the CTE of the substrate;
   the CTE of the filling material in the second light isolation structure matches the CTE of the dielectric layer; and
   the first light isolation structure is aligned with or is offset from the second light isolation structure.

10. The device of claim 7, wherein each of the two opposing sidewalls further comprises a first adhesion layer between the optical isolation layer and at least one of the dielectric layer or the substrate.

11. The device of claim 10, wherein the first adhesion layer includes a titanium layer.

12. The device of claim 7, further comprising an unfilled trench in the substrate or the dielectric layer, wherein sidewalls of the unfilled trench are optically opaque.

13. A method comprising:
   receiving a photonic integrated circuit including a substrate, a dielectric layer on the substrate, a waveguide, and a light sensitive component coupled to the waveguide, wherein the waveguide and the light sensitive component are in the dielectric layer;
   etching vias or a trench in the dielectric layer to expose a portion of the substrate, the vias or the trench surrounding the light sensitive component;
   filling the vias or the trench with a light reflection or light absorption material;
   forming a top metal cover on the dielectric layer and on top of the light sensitive component; and
   etching the substrate from a backside of the substrate opposite to the dielectric layer to form a deep trench in the substrate.

14. The method of claim 13, further comprising:
   filling the deep trench with the light reflection or light absorption material.

15. The method of claim 13, further comprising:
   depositing a thin adhesion layer on exposed surfaces of the deep trench;
   depositing a thin optical isolation layer on the thin adhesion layer; and depositing a filling material layer on the thin optical isolation layer, the filling material layer filling the deep trench and characterized by a coefficient of thermal expansion (CTE) that matches a CTE of the substrate.

16. The method of claim 13, further comprising:
forming additional dielectric layers and metal layers on the dielectric layer.

17. The method of claim 13, further comprising:
etching additional vias or trenches in the dielectric layer, the additional vias or trenches at a region including an input port of the waveguide;
filling the additional vias or trenches with the light reflection or light absorption material; and
etching the substrate from the backside of the substrate opposite to the dielectric layer to form an additional deep trench in the substrate at the region including the input port of the waveguide.

18. A method comprising:
receiving a photonic integrated circuit that includes a substrate, a dielectric layer on the substrate, and a light sensitive component in the dielectric layer;
etching a trench in the substrate, wherein the trench is adjacent to the light sensitive component;
depositing a thin adhesion layer on exposed surfaces of the trench;
depositing a thin optical isolation layer on the thin adhesion layer; and
depositing a first filling material layer on the thin optical isolation layer, wherein the first filling material layer fills the trench and is characterized by a coefficient of thermal expansion (CTE) that matches a CTE of at least one of the substrate or the dielectric layer.

19. The method of claim 18, wherein:
the CTE of the first filling material layer matches the CTE of the substrate; and
the method further comprises:
etching a portion of the first filling material layer that fills the trench, such that a top surface of the first filling material layer remaining in the trench is aligned with an interface between the substrate and the dielectric layer;
depositing a second filling material layer in the trench, wherein the second filling material layer is characterized by a CTE that matches the CTE of the dielectric layer; and
planarizing the second filling material layer.

20. The method of claim 19, wherein:
etching the portion of the first filling material layer includes etching the first filling material layer, the thin adhesion layer, and the thin optical isolation layer using a dry etching process; and
the method further comprises, before depositing the second filling material layer:
depositing a second adhesion layer on the exposed surfaces of the trench; and
depositing a second optical isolation layer on the second adhesion layer.

\* \* \* \* \*